United States Patent
Naka et al.

(10) Patent No.: US 7,982,835 B2
(45) Date of Patent: Jul. 19, 2011

(54) TRANSFLECTIVE LIQUID CRYSTAL DISPLAY DEVICE

(75) Inventors: Kenichirou Naka, Kanagawa (JP); Hiroshi Nagai, Kanagawa (JP); Michiaki Sakamoto, Kanagawa (JP); Kenichi Mori, Kanagawa (JP); Kousuke Shibata, Kanagawa (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 269 days.

(21) Appl. No.: 12/394,442

(22) Filed: Feb. 27, 2009

(65) Prior Publication Data

US 2009/0237578 A1   Sep. 24, 2009

(30) Foreign Application Priority Data

Mar. 19, 2008 (JP) ................................ 2008-072505

(51) Int. Cl.
  *G02F 1/1335* (2006.01)
  *G02F 1/1343* (2006.01)

(52) U.S. Cl. ....................................... 349/114; 349/141

(58) Field of Classification Search ................. None
  See application file for complete search history.

(56) References Cited

U.S. PATENT DOCUMENTS

2004/0263760 A1\* 12/2004 Kodate et al. ................. 349/151
2007/0008266 A1\* 1/2007 Kobashi et al. ................. 345/90

FOREIGN PATENT DOCUMENTS

| JP | 11-174491 | 7/1999 |
|---|---|---|
| JP | 2007-41572 | 2/2007 |
| JP | 2007-322941 | 12/2007 |

\* cited by examiner

*Primary Examiner* — Tina M Wong
(74) *Attorney, Agent, or Firm* — Young & Thompson

(57) ABSTRACT

A transflective liquid crystal display device is provided with a liquid crystal layer sandwiched between a first substrate with an array of switching elements and a second substrate with a black matrix so as to form a first area for a normally black display and a second area for a normally white display A first electric potential difference formed between the black matrix and both of the first common electrode and the first pixel electrode formed in the first area on the first substrate is made to be smaller than a larger one of the second electric potential difference formed between the black matrix and both of the second common electrode and the second pixel electrode formed in the second area.

14 Claims, 26 Drawing Sheets

TRANSFLECTIVE LIQUID CRYSTAL DISPLAY DEVICE

INCORPORATION BY REFERENCE

This application is based upon and claims the benefit of priority from Japanese patent application No. 2008-072505, filed on Mar. 19, 2008 and the disclosure of which is incorporated herein in its entirety by reference.

1. TECHNICAL FIELD

The present invention relates to a liquid crystal display device and in particular, relates to a transflective liquid crystal display device with a transmissive area and a reflective area.

2. BACKGROUND ART

The liquid crystal display (LCD) device is classified by difference in driving methods for a passive matrix type and an active matrix type.

The active matrix type is provided with active elements such as transistors or diodes for each pixel, and these elements are successively selected in a time-divisional mode to turn on them so as to charge the capacitance formed for each pixel, with applied signal voltage, while holding the signal voltage in the capacitance during the period of turn-off state. This active matrix type has the feature that the large-volume indication is possible with high contrast compared with the passive matrix type which apply voltage to the liquid crystal with a time-divisional matrix driving method.

As for the operation mode of the liquid crystal in the active matrix type LCD device, the twisted nematic (TN) mode has been used conventionally. This TN mode is used for a display by rotating the direction of the molecular axes of the liquid crystal molecules (hereinafter, referred to as the director) in the vertical direction with the vertical electric field to the substrate by rotating the director about 90 degrees between the upper and lower substrates so as to achieve the twist orientation of the liquid crystal molecules.

However, this TN mode has a problem that a viewing angle is small. Therefore, in a certain mobile use of seeing from the various directions, the indication from the oblique direction cannot be visually recognized any more. When the large-volume display is developed and the screen area becomes large, when the screen is judged from a viewpoint in an oblique direction, observation feature is different in the middle of the screen and the screen edge, and a proper display becomes impossible.

To this end, an in-plane switching (IPS) mode and a fringe field switching (FFS) mode have been developed. In these switching modes, the display operation is performed by rotating the director in the horizontal plane by generating the electric field in the parallel direction to the substrates. In such driving modes, wide viewing angle can be achieved compared with the LCD device of the TN mode, even if the viewpoint is changed, because the birefringence of the liquid crystal does not change greatly owing to that the liquid crystal is oriented in the horizontal direction.

The LCD device is adopted for display screens of the cellular phone appliances, personal digital assistants (PDA) and the business-use terminals in view of such features of light-weight, thin type and low power consumption. Although such LCD devices enable an excellent display at dark places and those places in less bright, there are some situations affected by such ambient light as sunny outdoor arid bright offices to degrade its visibility greatly and results in difficulty for confirming the display on the screen. In order to resolve such problems, a reflective type LCD device and a transflective LCD device have been developed. The reflective type LCD device enables its display by reflecting the ambient light with a reflector as a light source. On the other hand, the transflective LCD device can perform both of the reflective type display and the transparent type display by dividing the pixel into the reflective area and the transmissive area.

The transflective LCD device with the transverse electric field system is disclosed in such documents as Japanese Patent Application Laid-Open No. 2007-41572 (patent document 1), Japanese Patent Application Laid-Open No. 2007-322941 (patent document 2), and Japanese Patent Application Laid-Open No. Hei-11(1999)-174491 (patent document 3).

The LCD device disclosed in the patent document 1 is the transflective LCD device in which the transmissive areas and the reflective areas are provided in each pixel for the IPS mode. Its structure is shown in FIG. 26 through FIG. 29. FIG. 26A is a plan view showing the structure of the transflective LCD device in a structure when a reflector is removed, FIG. 26B is a plan view showing a structure added with the reflector, and FIG. 26C is a plan view showing a structure which is further added with a black matrix layer. FIG. 27A shows a cross-sectional structure along the XI-XI line shown in FIG. 26C. FIG. 27B is a cross-sectional structure along the XII-XII line shown in FIG. 26C, and FIG. 27C shows a cross-sectional structure along the XIII-XIII line shown in FIG. 26C. FIG. 28 is a schematic drawing indicating the structure of the wirings and electrodes of one pixel. FIG. 29 is a drawing showing the waveforms of the transmissive common signal and the reflective common signal.

As shown in FIG. 26 to FIG. 29, the LCD device disclosed in the patent document 1 is provided with a plurality of scanning lines 12, signal lines (data lines 13) and common electrode lines which are arranged in a matrix shape on a transparent insulating substrate (hereinafter, referred to as a TFT substrate 10) in which thin film transistors (TFTs) are formed. Each of the common electrode lines includes a transmissive common electrode line 18a which applies a reference potential to a transmissive area 3 and a reflective common electrode line 18b which applies a reference potential to a reflective area 2. A transmission-TFT 14a for a transmissive pixel electrode 17a in the transmissive area 3 of each pixel are respectively arranged at upper section in each intersection of the scanning lines 12 and the data lines 13. On the other hand, a reflection-TFT 14b and a reflective pixel electrode 17b corresponding to the reflective area 2 of the pixel are respectively arranged at lower section in the intersection of the scanning lines 12 and the data lines 13. The transmissive pixel electrode 17a is connected to a source electrode of the transmission-TFT electrically via a contact hole 170a while the reflective pixel electrode 17b is connected to a source electrode of the reflection-TFT electrically via a contact hole 170b.

A transmissive common electrode line 18a is connected to a transmissive common electrode 18a' electrically via a contact hole 180a while a reflective common electrode line 18b is connected to a reflective common electrode 18b' electrically via a contact hole 180b.

The transmissive pixel electrode 17a and the transmissive common electrode 18a' are provided so that both electrodes 17a and 18a' are arranged in parallel each other like stripes. As a result, the electric field is generated at the transmissive area such that the main component of the electric field crosses the both electrodes at right angle and parallel to the substrate surface. The reflective pixel electrode 17b and the reflective common electrode 18b are provided so that both electrodes 17b and 18b' are arranged in parallel each other like stripes. As a result, the electric field is generated at the reflective area such that the main component of the electric field crosses the both electrodes at right angle and parallel to the substrate surface.

In the reflective area 2, a reflective plate or film (hereinafter, referred to as a reflector 16) is provided under the reflective pixel electrode 17a and the reflective common electrode 18b' via an insulating film 15b.

According to the patent document 1, in the transflective LCD device using the IPS mode, the transmissive area 3 assumes a normally black mode, wherein the transmissive area 3 represents a black display upon absence of an applied voltage whereas the transmissive area 3 represents white display upon presence of the applied voltage. On the other hand, because the reflective area 2 assumes a normally white mode, wherein the reflective area 2 represents a white display upon absence of the applied voltage whereas the reflective area 2 represents the black display upon presence of the applied voltage, the transmissive common signal and the reflective common signal need to reverse its phase each other as shown in FIG. 29 when the identical video signal is used.

In that case, the different electric potentials are applied respectively between not only to adjacent pixels but also to the transmissive area and the reflective area within the pixel. Accordingly, the electric fields unrelated to the display are generated among them, and the light leakage caused by those unrelated electric fields occurs. Accordingly, in order to prevent the light leakage, such shading structure is generally used in the LCD device that a film of metals such as chrome or a laminated film of those oxidized metals, or a layer of black matrix 22 made of resin or the like dispersed with carbon particles.

In the case of using the active matrix type LCD device of the TN mode, such electric fields affecting the display is not generated any more in any electric potentials, because the electric field toward the black matrix 22 on the opposed substrate 20 is electrically shielded by a transparent electrode formed on the opposed substrate 20 close to the liquid crystal surface side.

However, the active matrix type LCD device with the IPS mode as shown in FIG. 27 somewhat affects a display. This is because a shielding electrode like the transparent electrode used for the TN mode does not exist between the liquid crystal layer 30 and the black matrix 22, and thus an electric potential of the black matrix 22 is affected by electric signals applied to the TFT substrate 10. In FIG. 27, the black matrix 22 is formed on the transparent insulating substrate 21, and a color filter layer 23 and an overcoat layer 27 are formed thereon.

In particular, in the transflective LCD device with the IPS mode, as shown in FIG. 27, the transmissive common electrode 18a' and the reflective common electrode 18b' are arranged so as to overlap with the black matrix 22, respectively. Therefore, the electric potential difference is generated between the black matrix 22 and those electrodes of the transmissive common electrode 18a' and transmissive pixel electrode 17a, respectively. As a result, the director revolves toward the plane direct ion and causes the light leakage.

In order to resolve such problems, the patent document 3 discloses a method to apply the electric potential to the black matrix 22. In the patent document 3 the influence for the director owing to the electric potential difference is suppressed by making the electric potential of the black matrix 22 to have the same electric potential of the common electrode which is attained by applying the same signal applied to the common electrode to the black matrix 22.

That is, this patent document 3 proposes a method of applying the same electric potential as the common electrode to the black matrix in order to resolve the influence caused by the electric potential at an area where the data line and the black matrix oppose each other in the transmissive LCD type with the IPS mode However, because there are two kinds of common signals in the LCD device using the inverting drive method to be resolved by the present invention, it does not meet both of them and thus the above-mentioned problem has not been resolved.

Thus, in order to apply the electric potential to the black matrix, it needs to use such materials as the metal of the low-resistance chrome or those oxidation laminated films as the material of the black matrix 22. However, these metallic films produce the cause of the light leakage because the incident light from the backlight exit from the transmissive area after subjected to those multiple reflections with these metallic films, the scanning line 12, the data line 13 and the transmissive common electrode 18a'.

In order to apply the electric potential to the opposite substrate side, there is a problem that a plurality of processes should be added as disclosed in the patent document 3. In recent years, because an overcoat layer 27 is formed on the color filter layer 23 to suppress the elution of the ion component into the liquid crystal from the color filter of the opposed substrate, the overcoat layer is needed to have such additional process of forming a through hole therein in order to apply the electric potential to the black matrix.

SUMMARY

An exemplary object of the invention is to provide a transflective LCD device which can suppress the light leakage caused by the electric potential formed between the electrode on the active matrix substrate and the black matrix on the opposed substrate.

A transflective LCD device is provided with an LC layer sandwiched between a first substrate with an array of switching elements and a second substrate with a black matrix so as to form a first area for a normally black display and a second area for a normally white display. A first electric potential difference formed between the black matrix and both of the first common electrode and the first pixel electrode formed in the first area on the first substrate is made to he smaller than a larger one of the second electric potential difference formed between the black matrix and both of the second common electrode and the second pixel electrode formed in the second area.

BRIEF DESCRIPTION OF THE DRAWINGS

Exemplary features and advantages of the present invention will become apparent from the following detailed description when taken with the accompanying drawings in which.

EXEMPLARY EMBODIMENTS

Figure 1A:
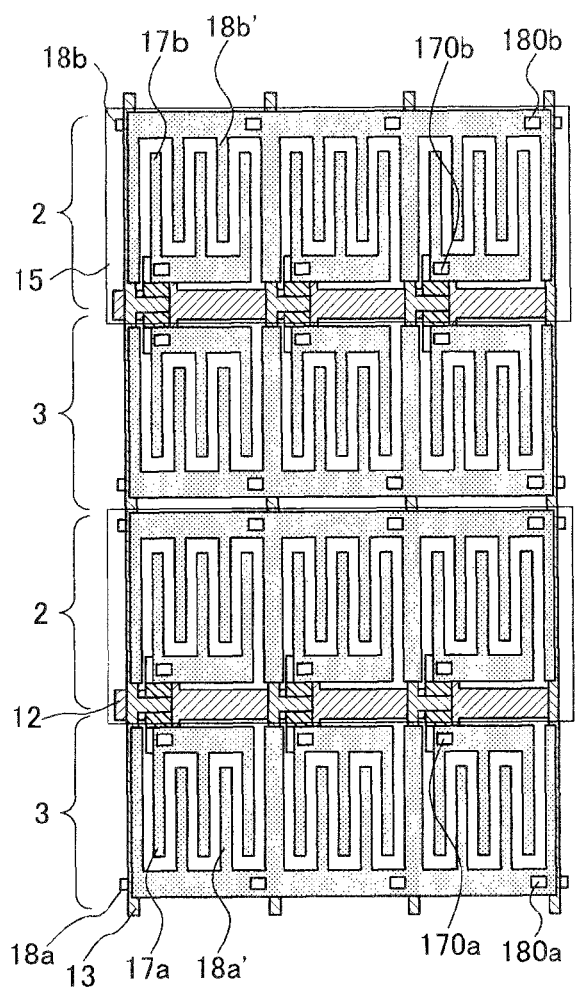
FIG. 1A is a plan view showing a pixel structure of a transflective LCD device according to a first exemplary embodiment of the present invention before a black matrix is added.

In the transflective LCD device, as described in the background art, when the IPS mode is adopted, the black and the white are reversely displayed. Therefore, in a usual drive system, when the transmissive area is made the normally black display, there is a problem that the reflective area would be the normally white display. First, this reverse display will be described.

In the following description, it is supposed that a first polarizer on an optical emission side (a screen side) and a second polarizer in an optical incident side (a backlight side) are arranged so that the polarization axes of them cross each other at right angle. It is also supposed that liquid crystal (LC) molecules are arranged in a direction shifted 90 degrees from a polarization axis (an optical transmission axis) direction of the second polarizer while voltage is not applied to the liquid crystal (LC) layer. For example, when the polarized light axial direction of the second polarizer is set to 0 degree, the polarized light axial direction of the first polarizer is set to 90 degrees, and directions of major axes of the LC molecules are set to 90 degrees. A cell gap in the transmissive area of the LC layer is adjusted such that retardation Δn·d (wherein Δn represents a refractive index anisotropy of the LC molecules and "d" represents the cell gap of the (LC) layer) is to be λ/2 (wherein λ represents a wavelength of the light). On the other hand, another cell gap in the reflective area of the LC layer is adjusted so that the retardation is to be λ/4.

[The Reflective Area]

First, in the reflective area, when a driving voltage is not applied to the LC layer, a linearly polarized light with a polarization direction (a longitudinal direction) of 90 degrees enters the LC layer after passing through the first Polarizer In the LC layer, because the optical axial direction of the linearly polarized incident light is parallel to directions of major axes of the LC molecules, the 90-degree linearly polarized light passes through the LC layer just as it is and enters a reflector. The reflector reflects the 90-degree linearly polarized light as it is, and it passes again the LC layer and enter the first polarizer. Because the polarized light axial direction of the first polarizer is 90 degrees the 90-degree linearly polarized light passes through the first polarizer, and results in a white display.

When the driving voltage is applied to the LC layer, the 90-degree linearly polarized light enters the LC layer after passing through the first polarizer in the same manner. In the LC layer, because the directions of major axes of the LC molecules changes from 0 degree to 45 degrees within the plane parallel to the substrate due to the applied voltage, the polarization direction of the incident light is deviated from the major axis direction of the LC molecules by 45 degrees. Furthermore, because the retardation of the LC layer is set to be λ/4, the linearly polarized light is changed into a clockwise-circularly-polarized light and enters the reflector. The light reflected by the reflector is changed into a counterclockwise-circularly-polarized light, and passes the LC layer again. The counterclockwise-circularly-polarized light is then changed by the LC layer into a zero-degree linearly-polarized light which has a polarized plane in a lateral direction (0 degree direction). Since the first polarizer has a polarizing axis at 90 degrees, the incident light is blocked to pass through, thereby representing a black display Thus, the reflective region operates in a normally-white node.

[The Transmissive Area]

On the other hand, in the transmissive area, when the voltage is not applied to the LC layer, a zero-degree linearly-polarized light enters the LC layer after passing through the second polarizer. In the LC layer, because this incident light has a polarized direction normal to the major axes of the LC molecules, the incident light passes the LC layer without changing its polarization state and enters the first polarizer. Since the polarized light axial direction of the first polarizer is 90 degrees, the transmitted light from the LC layer cannot pass the first polarizer and thereby representing the black display.

Likewise, when the voltage is applied to the LC layer, a zero-degree linearly-polarized light enters the LC layer after passing through the second polarizer. In the LC layer, the directions of major axes of the LC molecules changes from 0 degree to 45 degrees within the plane parallel to the substrate due to the applied voltage, and thus the polarization direction of the incident light is deviated from the major axis direction of the LC molecules by 45 degrees. Further, because the retardation of the LC layer is set to be λ/2, a zero-degree linearly-polarized light is changed into a 90-degree linearly-polarized light and enters the first polarizer. Because the polarized light axial direction of the first polarizer is 90 degrees, the transmitted light from the LC layer passes the first polarizer and thereby representing the white display. Accordingly, the transmissive area operates in the normally-black mode.

In the transflective LCD device, thereofore, when the electric field is either applied or not applied to the LC layer, there is a problem that the white display and the black display reverse in the reflective area and the transmissive area. Accordingly, in order to resolve this problem, a technique of applying reversing voltages to the reflective area and the transmissive area is used, for example, a gate-line inversion drive technique or a dot inversion drive technique is available.

When using this technique and by applying the reversing voltages only to the transmissive area, both of the transmissive area and the reflective area represent the white display. On the other hand, when the reversing voltages are applied only to the reflective area, both of the transmissive area and the reflective area represent the black display. However, by applying different voltages to the reflective area and the transmissive area, respectively, the electric potential difference occurs between the black matrix and the wirings to generate the electric field therebetween, and thus the director revolves in the plane direction by this electric field, and the light leakage occurs.

Figure 30A:
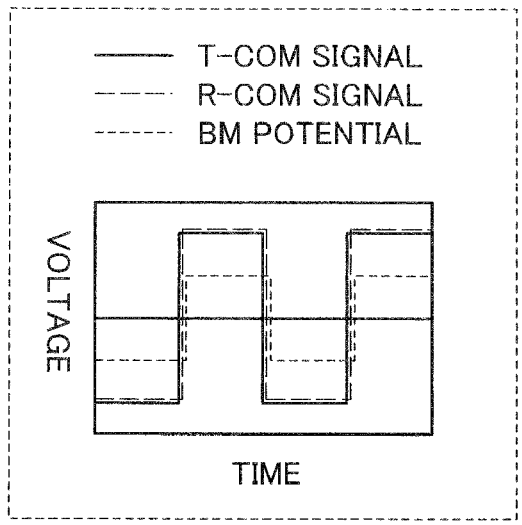
FIG. 30A to FIG. 30D are characteristic drawings showing the electric potential relationships among the transmissive common signal, the reflective common signal, and the black matrix in the related art.
Figure 30B:
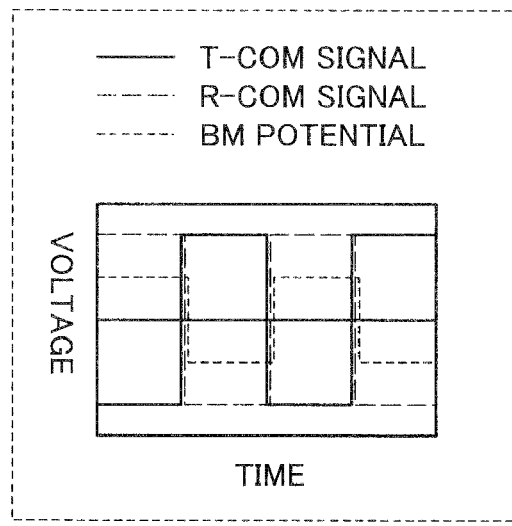
Figure 30C:
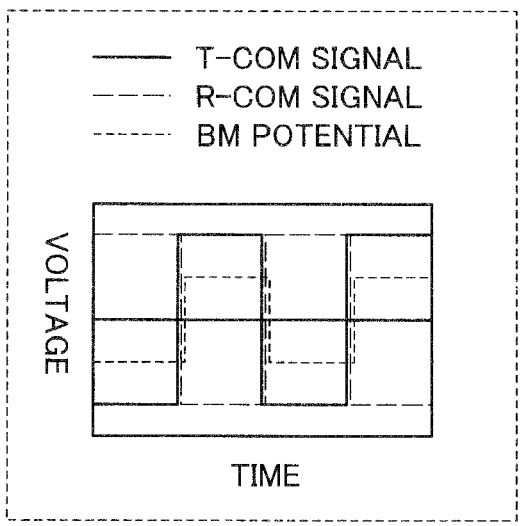
Figure 30D:
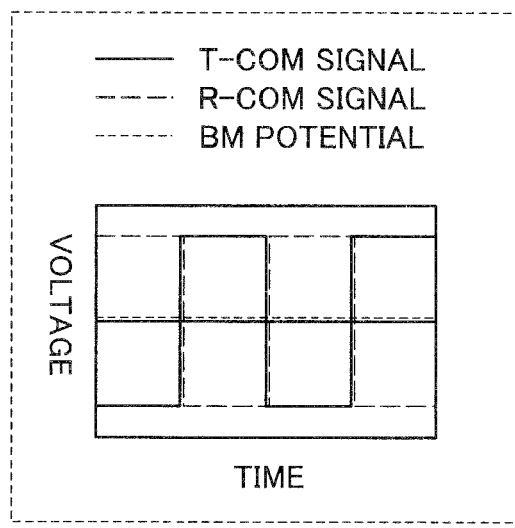

More specifically, when the same phase voltage is applied to the reflective common electrode and the transmissive common electrode in each pixel, as shown in FIG. 30A, the electric potential of the black matrix will be the same phase as the reflective common electrode and the transmissive common electrode, and thus both of the electric potential difference between the reflective common electrode and the black matrix and the electric potential difference between the transmissive common electrode and the black matrix are small. However, when the anti-phased voltages are applied to the reflective common electrode and the transmissive common electrode, respectively, the electric potential of the black matrix represents the same phase (FIG. 30B or FIG. 30C) of either one of the reflective common electrode and the transmissive common electrode, or a middle potential (FIG. 30D) of the electric potentials of the both common electrodes, and therefore the electric potential difference between the reflective common electrode and the black matrix, and the electric potential difference between the transmissive common electrode and the black matrix become large. Accordingly, the director rotates within in the plane parallel to the substrates by the electric field by these electric potential differences.

Here, the electric charges generated between the black matrix and each electrode, or between the black matrix and the wirings can be calculated, respectively.

Figure 31A:
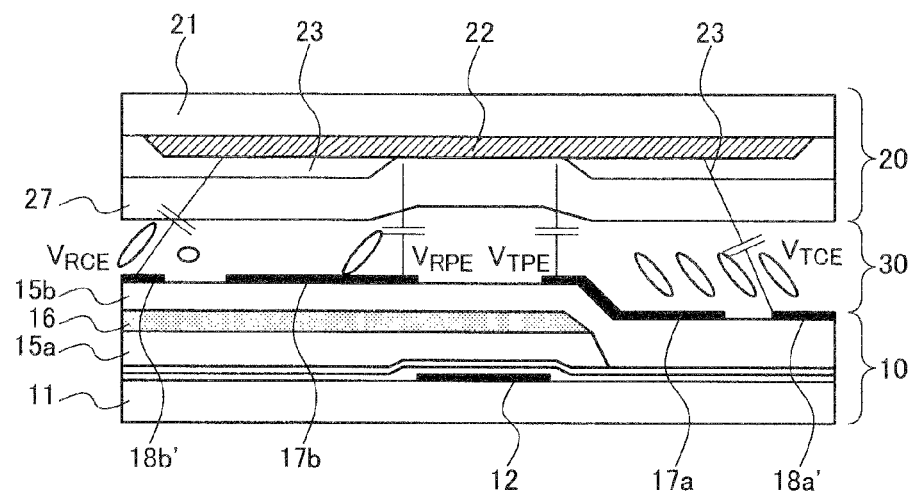
FIG. 31A is an explanatory cross section in the display portion of the transflective LCD device according to the present invention.
Figure 31B:
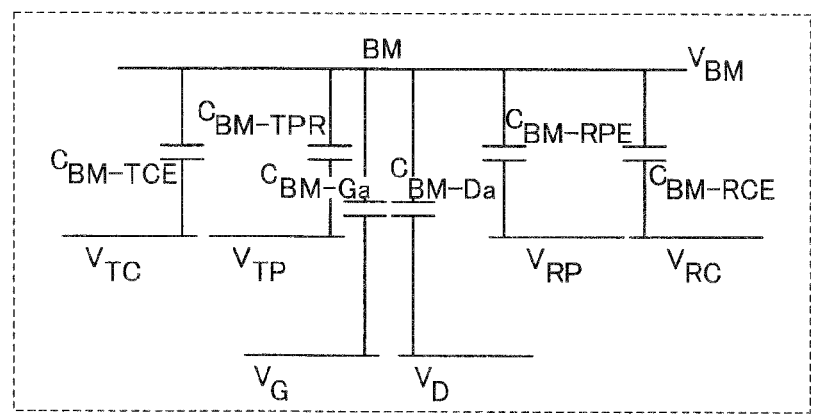
FIG. 31B is a diagram of an equivalent circuit for FIG. 31A.
Figure 32A:
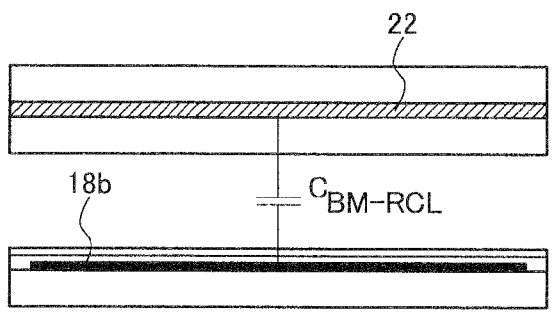
FIG. 32A to FIG. 32D are explanatory cross section in the peripheral portion (outside of the screen) of the transflective LCD device.
Figure 32B:
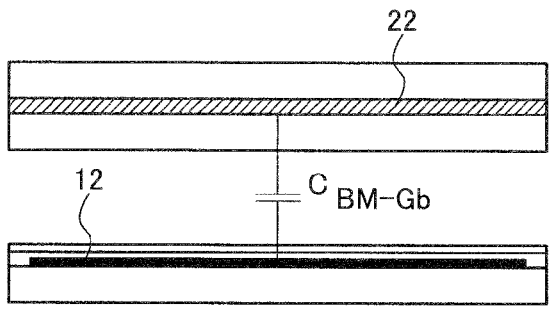
Figure 32C:
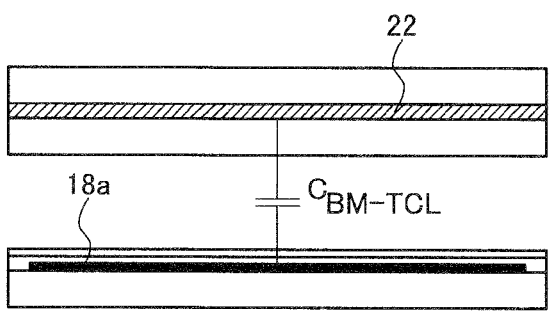
Figure 32D:
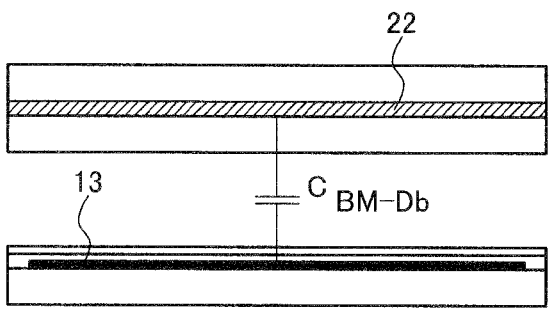
Figure 32E:
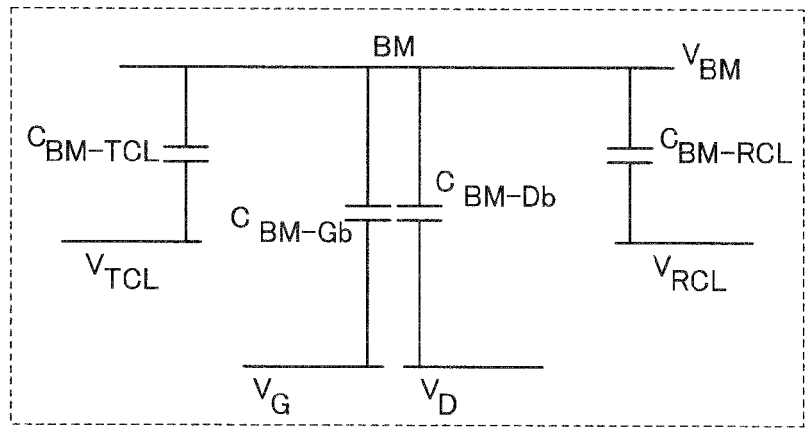
FIG. 32E is a diagram of an equivalent circuit for FIG. 32A to FIG. 32D.

Regarding a display area, firstly, as shown in a sectional structural view in FIG. 31A and its equivalent circuit diagram shown in FIG. 31B, the electric potential of the scanning line is designated as VG, the electric potential of the data line as VD, the electric potential of the transmissive common electrode as VTC, the electric potential of the transmissive pixel electrode as VTP, the electric potential of the reflective common electrode as VRC, and the electric potential of the reflective pixel electrode as VRP. The capacitance between the scanning line and the black matrix is designated as CBM-Ga, the capacitance between the data line and the black matrix as CBM-Da, the capacitance between the transmissive common electrode and the black matrix as CBM-TCE, the capacitance between the transmissive pixel electrode and the black matrix as CBM-TPE, the capacitance between the reflective common electrode and the black matrix as CBM-RCE, and the capacitance between the reflective pixel electrode and the black matrix as CBM-RPE. Then the electric charges generated between the black matrix and each electrode, or between the black matrix and the wirings are expressed by the following equation (1).

$$CBM\text{-}TCE \times VTC + CBM\text{-}TPE \times VTP + CBM\text{-}RCE \times VRC + CBM\text{-}RPE \times VRP + CBM\text{-}Ga \times VG + CBM\text{-}Da \times VD \quad (1)$$

As for the peripheral area, as shown in FIGS. 32A to 32E, the electric potential of the scanning line is designated as VG, the electric potential of the data line as VD, the electric potential of the transmissive common electrode line as VTCL, the electric potential of the reflective common electrode line as VRCL. The capacitance between the scanning line and the black matrix is designated as CBM-Gb, the capacitance between the data line and the black matrix as CBM-Db, the capacitance between the transmissive common electrode line and the black matrix as CBM-TCL, and the capacitance between the reflective common electrode and the black matrix as CBM-RCL. Thus, the electric charge generated between the black matrix and each wiring is expressed by the following equation (2).

$$CBM\text{-}TCL \times VTC + CBM\text{-}RCL \times VRC + CBM\text{-}Gb \times VG + CBM\text{-}Db \times VD \quad (2)$$

Accordingly, total electric charge QBM accumulated on the black matrix is expressed by the following equation (3).

$$QBM = (CBM\text{-}TCE + CBM\text{-}TCL) \times VTC + CBM\text{-}TPE \times VTP + (CBM\text{-}RCE + CBM\text{-}RCL) \times VRC + CBM\text{-}RPE \times VRP + (CBM\text{-}Ga + CBM\text{-}Gb) \times VG + (CBM\text{-}Da + CBM\text{-}Db) \times VD \quad (3)$$

When the black display for an entire screen is performed, the above-mentioned equation can be splitted to the electric charge QBM (1) having the same or the same side charge to the transmissive pixel electrode, and the electric charge QBM (2) which functions as reverse or negative to the transmissive pixel electrode.

$$QBM(1) = (CBM\text{-}TCE + CBM\text{-}TCL) \times VTC + CBM\text{-}TPE \times VTP + (CBM\text{-}Da + CBM\text{-}Db) \times VD + CBM\text{-}RPE \times VRP \text{ (from a writing frame to the 2n-th frame)} \quad (4)$$

$$QBM(2) = (CBM\text{-}RCE + CBM\text{-}RCL) \times VRC + CBM\text{-}RPE \times VRP \text{ (from the writing frame to the (2n+1)th frame)} + (CBM\text{-}Ga + CBM\text{-}Gb) \times VG \quad (5)$$

The electric potential VBM of the black matrix can be disclosed by the following equation.

$$VBM = QBM/\text{total of } CBM = [(CBM\text{-}TCE + CBM\text{-}TCL) \times VTC + CBM\text{-}TPE \times VTP + (CBM\text{-}RCE + CBM\text{-}RCL) \times VRC + CBM\text{-}RPE \times VRP + (CBM\text{-}Ga + CBM\text{-}Gb) \times VG + (CBM\text{-}Da + CBM\text{-}Db) \times VD]/[CBM\text{-}TCE + CBM\text{-}TCL + CBM\text{-}TPE + CBM\text{-}RCE + CBM\text{-}RCL + CBM\text{-}RPE + CBM\text{-}Ga + CBM\text{-}Gb + CBM\text{-}Da + CBM\text{-}Db] \quad (6)$$

Because the scanning lines and the data lines in the display area are covered with either the transmissive common electrode or the reflective common electrode to provide an electrically shielded structure, it is assumed that the black matrix does not affect those lines. As to the scanning lines and the data lines in the peripheral area, the influence of the black matrix can be eliminated by covering them with such a conductive film as the same one of the transmissive common electrode. By adopting such structures, the terms of CBM-Da, CBM-Db, CBM-Ga and CBM-Gb of the above-mentioned equation disappears substantially, and thus it is allowed to only consider the interaction between the black matrix and either one of the reflective common electrode, the reflective common electrode line, the transmissive common electrode and the transmissive common electrode line.

In the LCD device, the electric potential of the black matrix becomes influential in the area on which the voltage is not applied between the common electrode and the pixel electrode, and the display quality degrades greatly by the light leakage in the black display state. However, as mentioned above, when the gate-line inversion drive technique or the dot inversion drive technique is used, because it will be the black display when the voltage is only applied to the reflective area, in order to reduce the electric potential difference between VBM and VTC, it is necessary to make the contribution of QBM (1) large, or make the contribution of QBM (2) small.

Further, a following relationship can be stated:

Electric charge $Q \propto$ Capacitance $C \times$ Voltage $V \propto \epsilon \times S \times V/d$ (wherein the "$\epsilon$" represents dielectric constant of the configuration material between the black matrix and either one of each electrode and wiring, the "S" represents an overlapped area between the black matrix and either one of each electrode and wiring, and the "d" represents the distance between the black matrix and either one of each electrode and wiring.

Accordingly, in order to reduce the electric potential difference between the electrode of the transmissive area and the black matrix, the following four techniques are available.

(1) Considering the fact that capacitance changes proportionally to the overlapping area between the black matrix and either one of each electrode and wiring, in order to increase the contribution of QBM (1), electrode surface areas forming CBM-TCE, CBM-TCL, CBM-TPE, CBM-Da and CBM-Db are made large. In order to reduce the contribution of QBM (2), electrode surface areas forming CBM-RCE, CBM-RCL, CBM-Ga and CBM-Gb are made small. Further, the black matrix can be separated and shielded so that the electric potential of the transmissive area does not affect them.

(2) Because the electric charge changes proportionally to the voltage, either VTC is increased to make the contribution of QBM (1) large, or VRC and VG are reduced to make the contribution of QBM (2) small. More specifically, the above-stated condition can be achieved by either increasing the amplitude of the transmissive common signal, or decreasing the amplitude of the reflective common signal, or increasing the voltage at the off time of the gate signal.

(3) Because the electric charge changes in inverse proportion to the distance between the black matrix and either one of each electrode and wiring, in order to make the contribution of QBM (1) large, the distant gaps between the black matrix and either one of the transmissive common electrode, the transmissive pixel electrode and the data line are made small, or to make the contribution of QBM (2) small, the distant gaps between the black matrix and either one of the reflective common electrode and the scanning line are made large.

(4) Because the capacitance is proportional to the dielectric constant of the configuration material between the black matrix and either one of each electrode and wiring, in order to make the contribution of QBM (1) large, the high permittivity material member is sandwiched between the black matrix and either one of the transmissive common electrode, the transmissive pixel electrode and the data line, or in order to make the contribution of QBM (2) small, the low permittivity material member is sandwiched between the black matrix and either one of the reflective common electrode and the scanning line.

By using these techniques, the electric potential difference between the electrodes of the transmissive area and the black matrix can be made small, and desirably, by decreasing the electric potential difference to the level no more than the threshold value of activating the LC layer, the light leakage can be suppressed. Hereinafter, each technique will be described with reference to the drawings.

Exemplary Embodiment 1

Figure 1B:
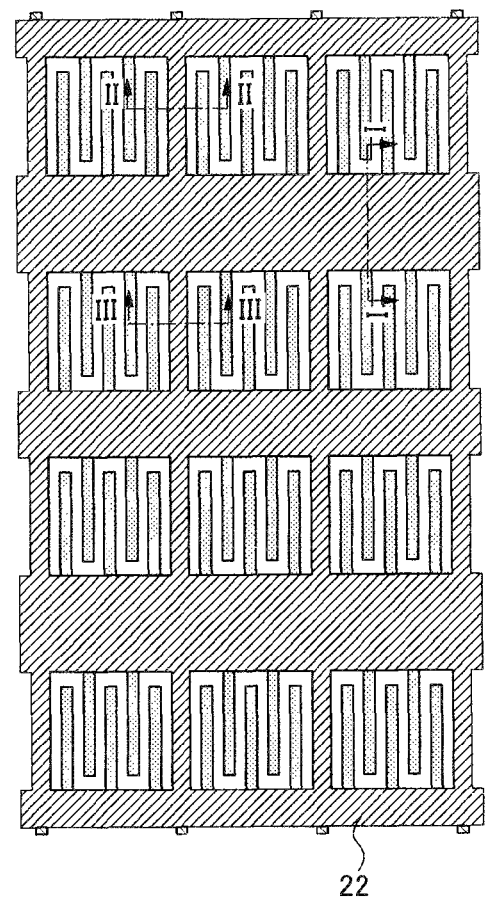
FIG. 1B is a plan view showing a pixel structure of the transflective LCD device according to the first exemplary embodiment of the present invention after the black matrix layer is added.
Figure 2A:
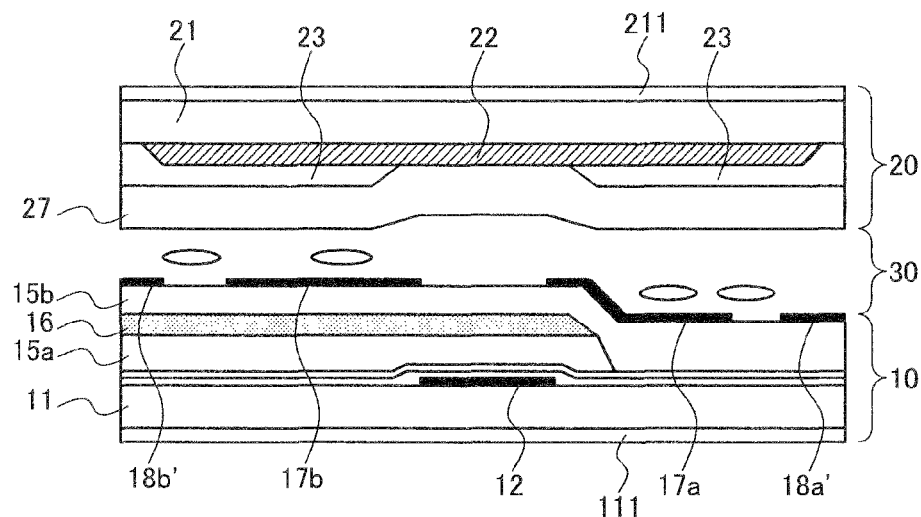
FIG. 2A is a cross sectional view along the I-I line shown in FIG. 1B.
Figure 2B:
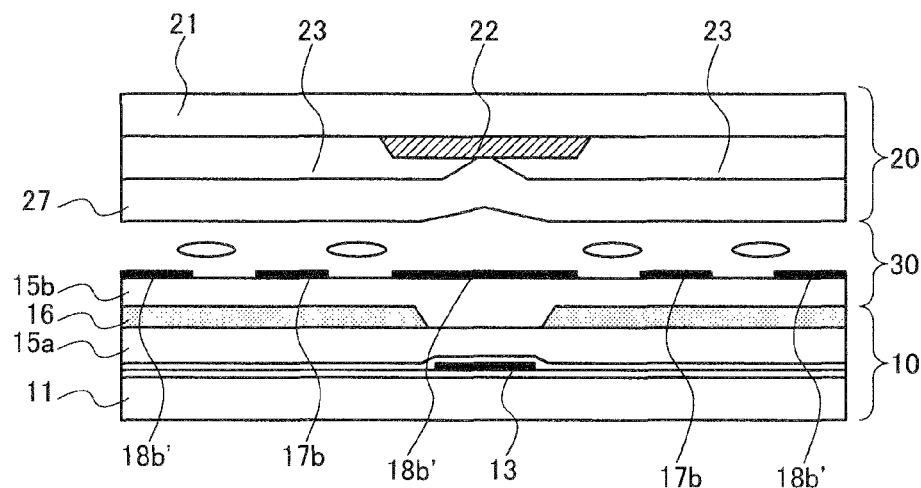
FIG. 2B is a cross sectional view along the II-II line shown in FIG. 1B.
Figure 2C:
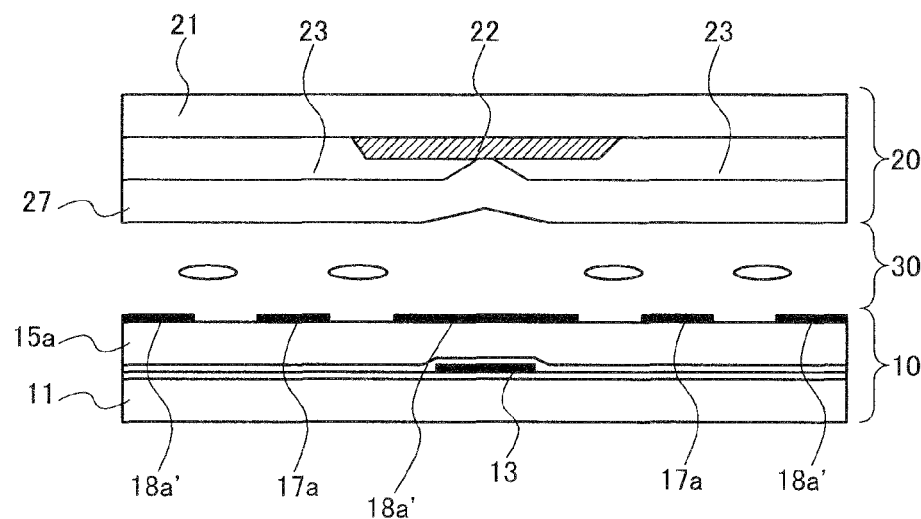
FIG. 2C is a cross sectional view along the III-III line shown in FIG. 1B.
Figure 3A:
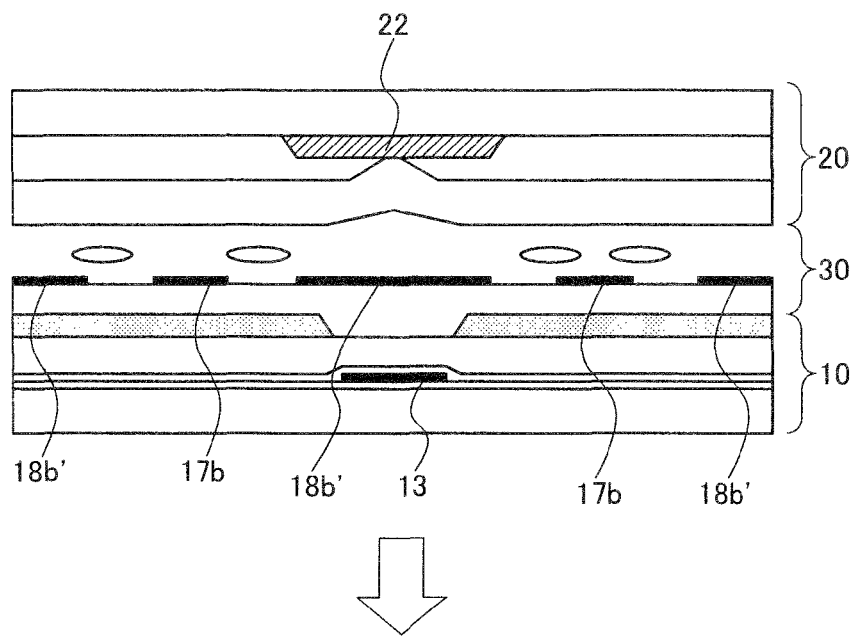
FIG. 3A shows FIG. 2B again for comparison with FIG. 3B.
Figure 4A:
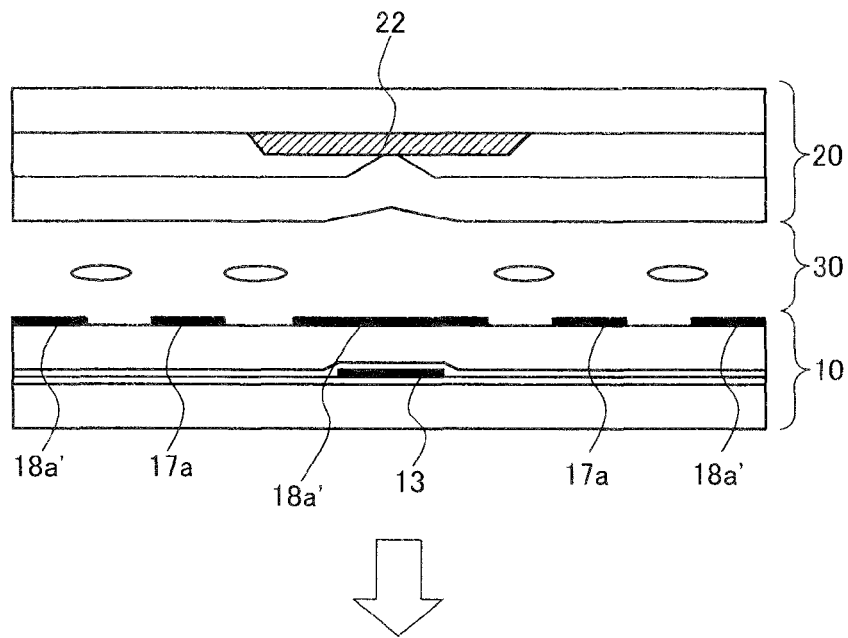
FIG. 4A shows FIG. 2C again for comparison with FIG. 4B.
Figures 5A, 5B:
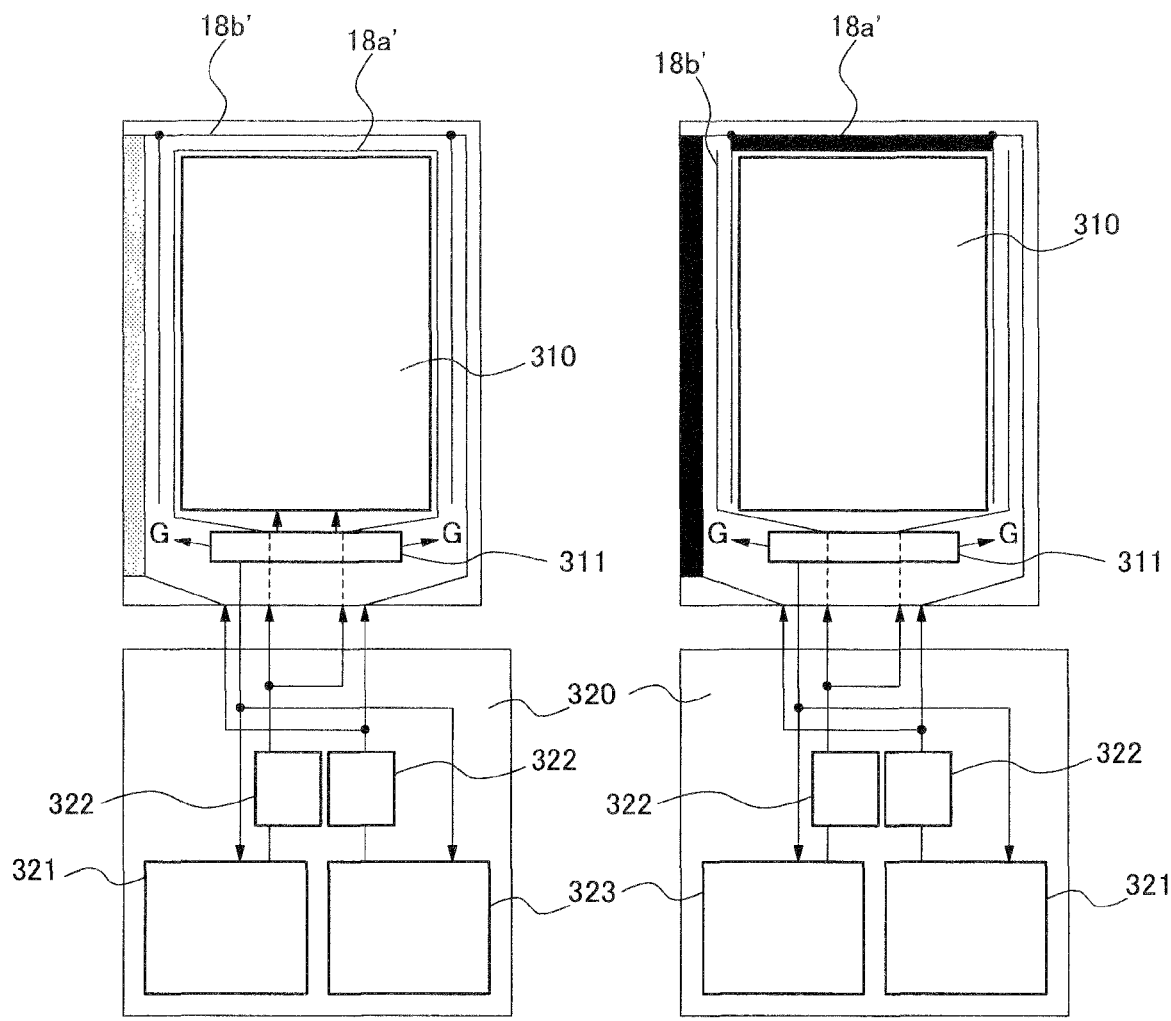
FIG. 5A is a schematic circuit diagram showing the state of wiring in the peripheral area around a display portion of the transflective LCD device according to the first exemplary embodiment of the present invention.
FIG. 5B is a schematic circuit diagram showing a partially changed example of FIG. 5A.
Figure 6:
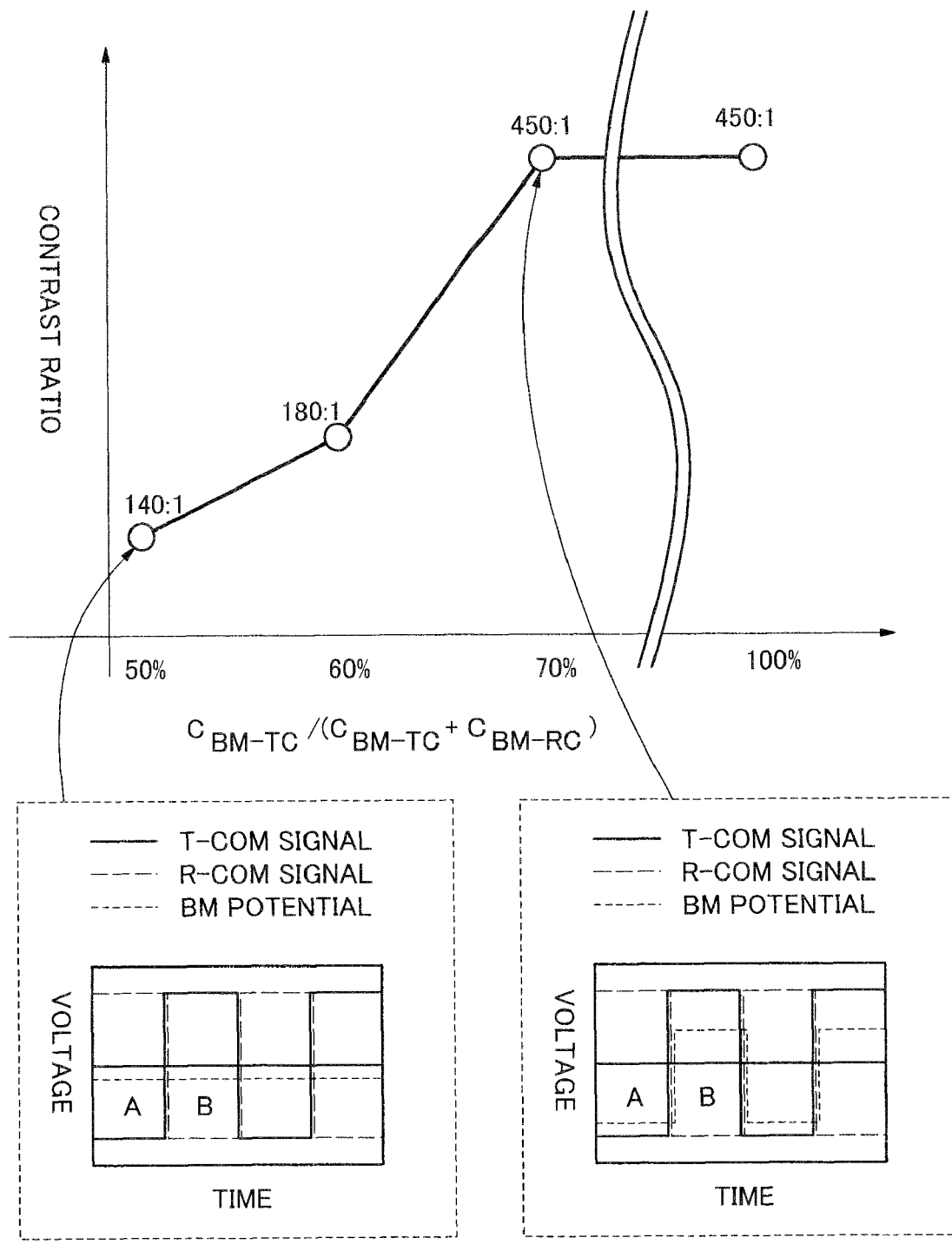
FIG. 6 is a graph showing the advantage of the first exemplary embodiment of the present invention and indicates the correlation between an area transmission ratio and a contrast ratio.

First, the LCD device according to the first exemplary embodiment of the present invention will be described with reference to FIG. 1 through FIG. 15. In FIG. 1A, a plan view of the pixel structure of the transflective LCD device of this exemplary embodiment is shown as a structure before a black matrix is added. FIG. 1B shows the pixel structure after adding the black matrix to the structure shown in FIG. 1A. FIG. 2A is a cross sectional view along the I-I line shown in FIG. 1B. FIG. 2B is a cross sectional view along the II-II line shown in FIG. 1B. FIG. 2C is a cross sectional view along the III-III line shown in FIG. 1B. FIG. 3 to FIG. 5 are drawings showing the other pixel structure of the transflective LCD devices of this exemplary embodiment, and FIG. 6 is a graph showing the advantage of this exemplary embodiment. FIG. 7 to FIG. 10 are schematic diagrams illustrating the inversion drive technique, and FIG. 11 to FIG. 15 are schematic diagrams showing variety of LCD devices to which the structure of this exemplary embodiment is applied.

As shown in FIG. 1 and FIG. 2, the LCD device of this exemplary embodiment includes the first substrate (hereinafter, referred to as an opposed substrate 20) arranged in a viewer's side and the second substrate (hereinafter, referred to as a TFT substrate 10) on which active elements such as TFTs (Thin Film Transistors) are arranged to provide a transmissive area which functions as a transmissive type LCD device and a reflective area which functions as a reflective type LCD device. An LC layer 30 is sandwiched between the two substrates 20 and 10. Further the LCD device includes a first polarizer 211 arranged on the viewer's side of the opposed substrate 20 and a second polarizer 111 or the like arranged on the backlight source side of the TFT substrate 10. Just for simplifying the drawings, the first polarizer 211 and the second polarizer 111 are omitted in other drawings.

The TFT substrate 10 is provided with a plurality of scanning lines 12, data lines 13 and common electrode lines which are arranged in a matrix shape on a transparent insulating substrate 11. Each of the common electrode lines includes a transmissive common electrode line 18a applying a reference potential to the transmissive area 3 and a reflective common electrode line 18b applying the reference potential to the reflective area 2. A transmission-TFT 14a and a transmissive pixel electrode 17a in the transmissive area 3 of each pixel are respectively arranged at upper area in each intersection of the scanning lines 12 and the data lines 13. On the other hand a reflection-TFT 14b and a reflective pixel electrode 17b in the reflective area 2 of the pixel are respectively arranged at lower area in the intersection of the scanning lines 12 and the data lines 13. The transmissive pixel electrode 17a is electrically connected to the source electrode of the transmission-TFT 14a via a contact hole 170a while the reflective pixel electrode 17b is electrically connected to the source electrode of the reflection-TFT 14b via a contact hole 170b.

The transmissive common electrode line 18a is electrically connected to a transmissive common electrode 18a' via a contact hole 180a while the reflective common electrode line 18b is electrically connected to a reflective common electrode 18b' via a contact hole 180b.

The above-mentioned transmissive common electrode 18a' the transmissive pixel electrode 17a, the reflective common electrode 18b' and reflective pixel electrode 17b are usually made of a transparent conductive material such as ITO (Indium Tin Oxide). The transmissive pixel electrode 17a and the transmissive common electrode 18a' are provided so that the two electrodes are arranged in parallel like the stripes as shown in FIG. 1, and it is constructed to produce the electric field in the transmissive area having main component crossing normal to the two electrodes parallel to the substrate surface. At the same time, the reflective pixel electrode 17b and the reflective common electrode 18b' are provided so that the two electrodes are arranged in parallel like the stripes as shown in FIG. 1, and it is constructed to produce the electric field in the reflective area having main component crossing normal to the two electrodes parallel to the substrate surface.

In the reflective area, as shown in FIG. 1 and FIG. 2A, the reflector 15 is formed under the reflective common electrode 18b' and the reflective pixel electrode 17b with an insulating film 15b sandwiched therebetween.

The alignment film (not shown) which controls the liquid crystal molecular orientation is formed on the TFT substrate 10 adjacent to the LC layer 30.

As for the opposed substrate 20, a black matrix 22 and a color filter 23 are formed on a transparent insulating substrate 21.

The black matrix 22 is formed by dispersing carbon particles or black pigments into a resin. The black matrix 22 is arranged on a part which shades the light leakage in the display, for example, on the part overlapping with the scanning line 12 and the data line 13 to shade the light leakage due to the electric field generated between the pixels and between the electrodes of the transmissive area and the reflective area, and to suppress the light leakage between the wirings arranged outside of the display portion.

The distance between the TFT substrate 10 and the opposed substrate 20, that is, the thickness of the LC layer 30 is determined as follows in the transmissive area and the reflective area, respectively. That is, in the transmissive area, it is designed that the phase difference is to be $\lambda/2$ when applying the voltage to perform the white display. In the reflective area, it is designed that the phase difference is to be $\lambda/4$ when applying the voltage to perform the black display.

The LC molecules of the LC layer 30 are aligned in parallel to perform homogeneous orientation between the substrates, and the direction of the director is oriented in the direction that tilted 15 degrees from the stripe direction of the electrodes, and the direction is changed by the electric field formed between the common electrode and the pixel electrode.

The polarizer are provided on the outside surface of the TFT substrate 10 and the opposed substrate 20, respectively, i.e., the side remote from the LC layer 30, such that the respective absorption axis of the polarizer are crossed each other, and thereby arranging so that the initial director direction is identical to either one of the absorption axis of the polarizer.

This exemplary embodiment has a feature in the positional relationship with the common electrode line or the common electrode formed on the TFT substrate 10 and the black matrix 22 formed on the opposed substrate 20, and thus material and film thickness of each component member and the manufacturing method or the like are not limited in particular.

Here, as mentioned above, because the black display and the white display reverse in the transflective LCD device, it needs to drive by applying the voltages of different phases to the transmissive area and the reflective area, respectively. When the voltages with different phases are applied, the electric potential of the black matrix 22 fluctuates, and the electric potential differences between the black matrix 22 and either one of the transmissive common electrode line 18a, the transmissive common electrode 18a', and the transmissive pixel electrode 17a are made large.

Accordingly, in this exemplary embodiment, in order to resolve this problem, overlapping areas between the black matrix 22 and either one of the transmissive common electrode line 18a, the transmissive common electrode 18a', and the transmissive pixel electrode 17a are made large.

Specifically, as shown in FIG. 1, FIG. 2B and FIG. 2C, the transmissive common electrode 18a' and the reflective common electrode 18b' are arranged on the data line 13. Because the black matrix 22 is arranged so as to overlapp with the data line 13, the width of the black matrix 22 arranged just above the transmissive common electrode 18a' is made wider than that of the black matrix 22 arranged just above the common electrode 18b'. As a result, the electrode surface area forming the capacitance CBM-TCE between the transmissive common electrode 18a' and the black matrix 22 is made to be larger than the electrode surface area forming the capacitance CBM-RCE between the reflective common electrode 18b' and the black matrix 22. Accordingly, it is possible to increase the contribution of the electric charge QBM (1) against the transmissive common electrode 18a'.

Figure 26A:
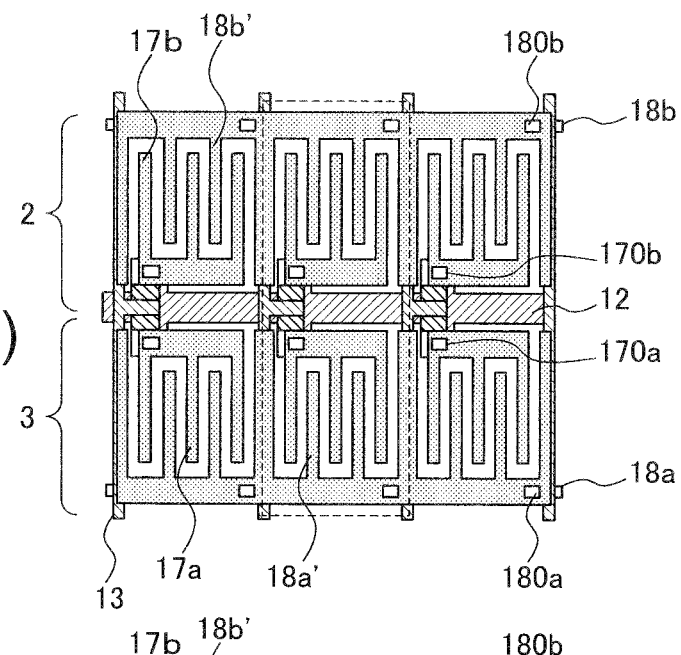
FIG. 26A is a plan view showing a pixel structure of a conventional transflective LCD device according to a related art before a reflector and a black matrix are added.
Figure 26B:
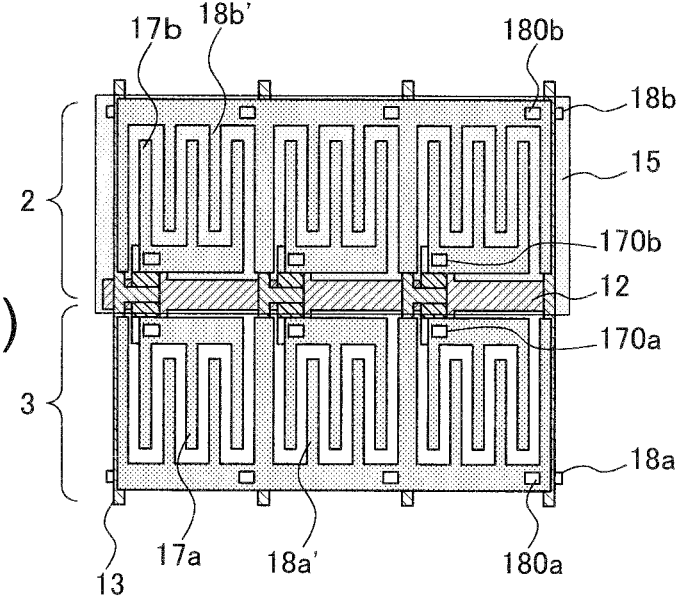
FIG. 26B is a plan view showing a pixel structure of the conventional transflective LCD device according to a related art after the reflector is added.
Figure 26C:
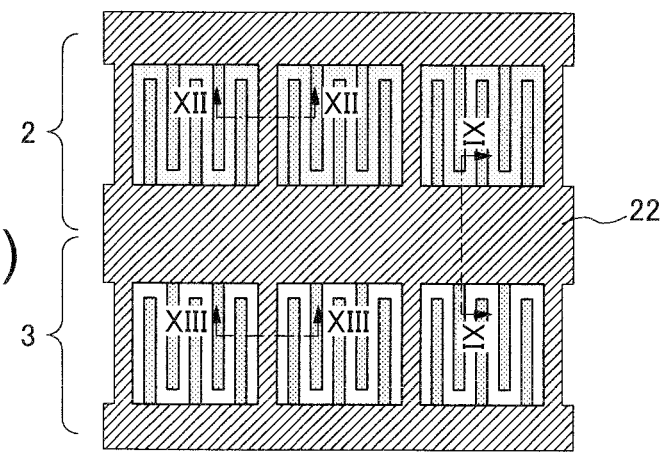
FIG. 26C is a plan view showing a pixel structure of the conventional transflective LCD device according to a related art after the black matrix layer is added.
Figure 27A:
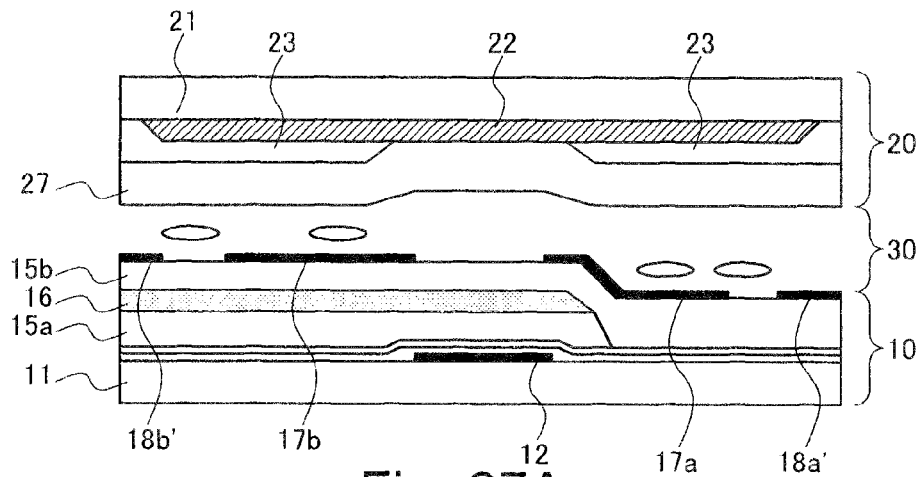
FIG. 27A is a cross sectional view along the XI-XI line shown in FIG. 26B.
Figure 27B:
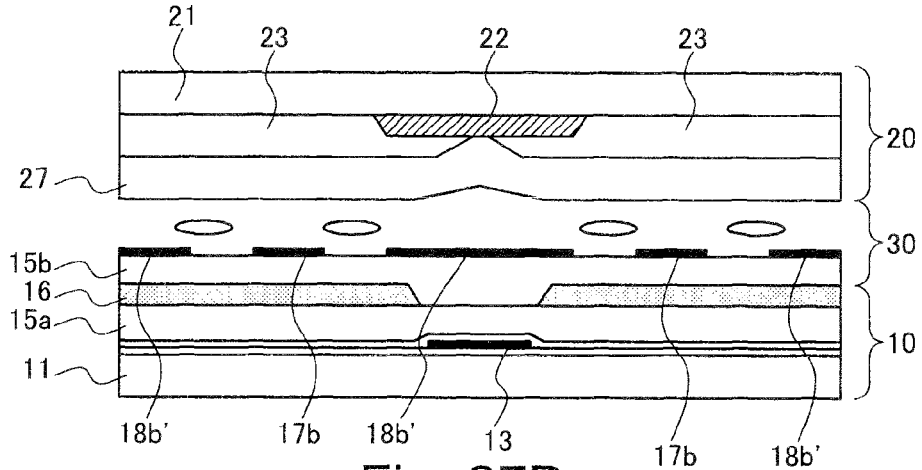
FIG. 27B is a cross sectional view along the XII-XII line shown in FIG. 26B.
Figure 27C:
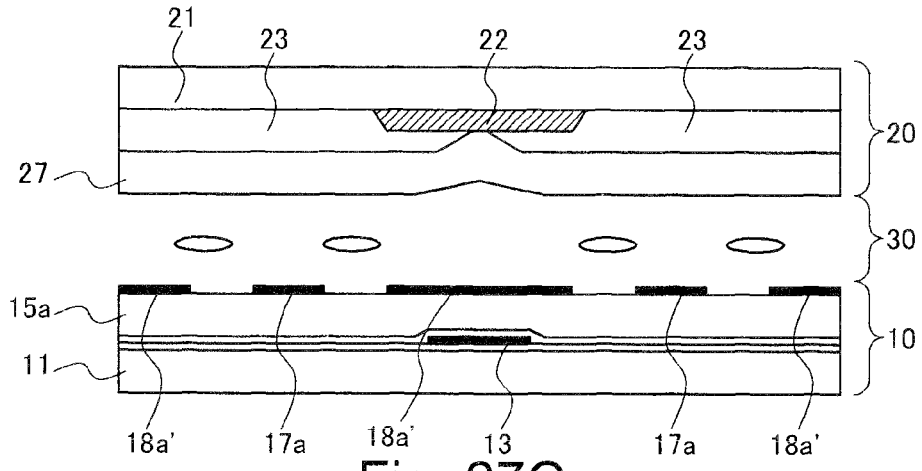
FIG. 27C is a cross sectional view along the XIII-XIII line shown in FIG. 26B.
Figure 28:
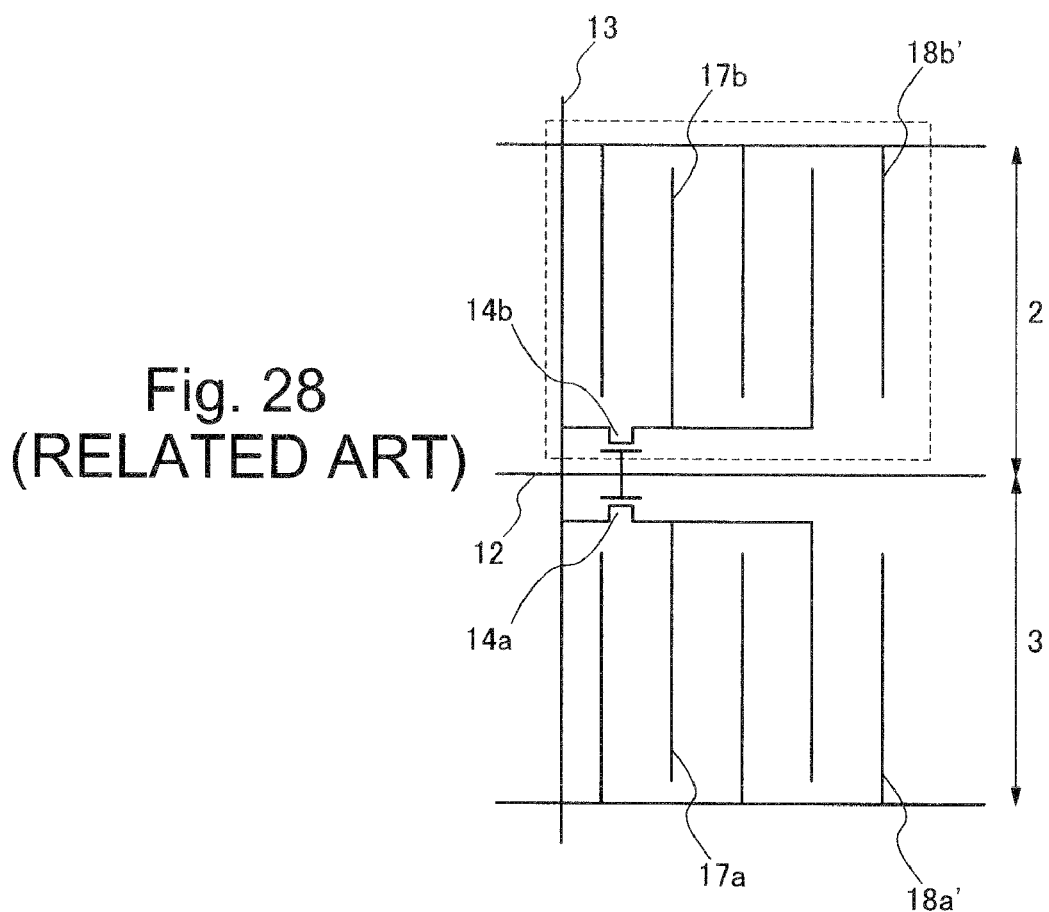
FIG. 28 is a schematic diagram of a wiring system of the conventional transflective LCD device according to a related art.
Figure 29:
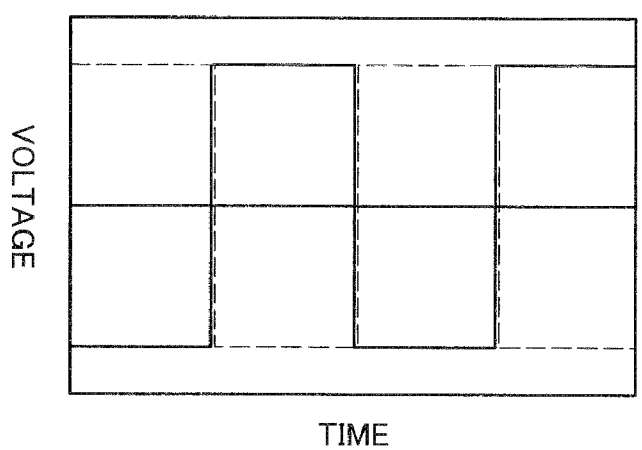
FIG. 29 is a drawing showing a waveform of conventional transmissive common signal and reflective common signal according to a related art.

In this case, the width of the black matrix 22 arranged just above the transmissive common electrode 18a' may be made wider than that of the related art shown in FIG. 26C. Or the width of the black matrix 22 arranged just above the reflective common electrode 18b' may be made smaller than that of the related art shown in FIG. 26C. When the width of the black matrix 22 arranged just above the reflective common electrode 18b' is made small, there is a possibility to cause the light leakage through the side of the black matrix 22. In that case, however, it is possible to suppress the light leakage through the side of the black matrix 22 either by darkening or blackening the reflective common electrode 18b' and the reflective pixel electrode 17b in the reflective area 2 with oxidation treatment, or by increasing the ITO film thickness to reduce the transmission factor of the ITO so as to reduce the reflected light. It is also possible to suppress the light leakage by using such metal having reflectivity lower than that of the reflector as a metallic film made of chrome or molybdenum, preferably such metal treated with low reflective processing as a laminated oxidation film metal made of two-layer chrome Cr/CrO or two-layer nickel Ni/NiO. Furthermore, on the reflective common electrode and the reflective pixel electrode, those light leakage produced by performing different liquid crystal molecular orientation therebetween can also be suppressed simultaneously, and the reflective contrast can be improved.

Figure 3B:
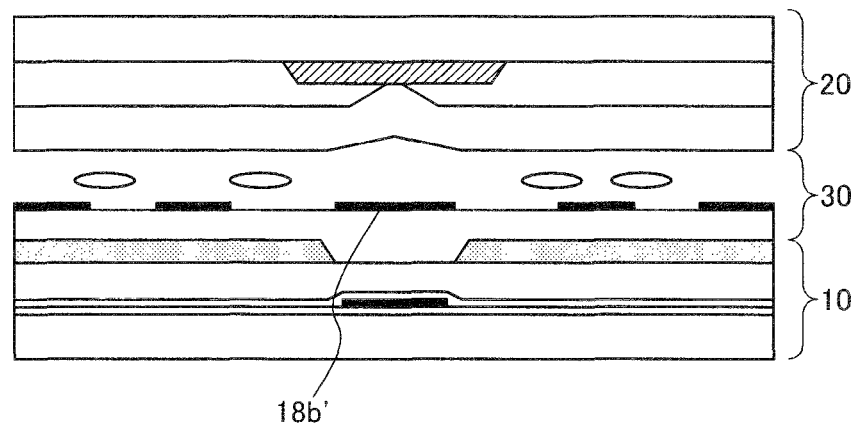
FIG. 3B is a cross sectional view showing a partially changed example of FIG. 3A.
Figure 4B:
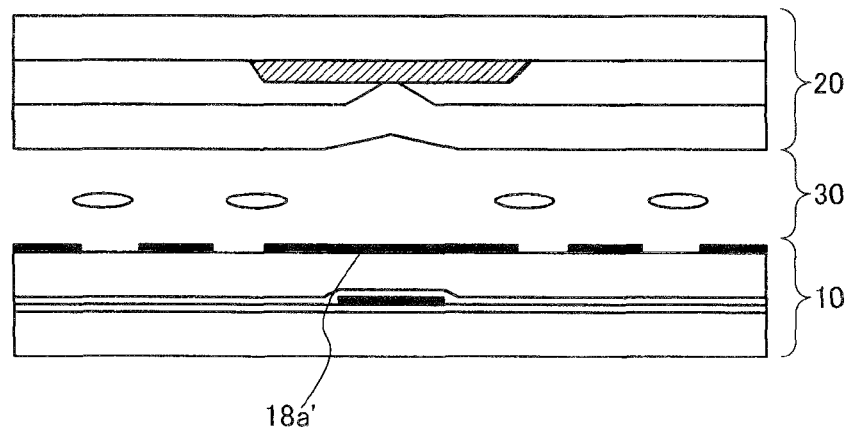
FIG. 4B is a cross sectional view showing a partially changed example of FIG. 4A.

In FIG. 1 and FIG. 2, the width of the black matrix 22 arranged just above the transmissive common electrode 18a' is made large (FIG. 2C), and the width of the black matrix 22 arranged just above the reflective common electrode 18b' is made small (FIG. 2B). However, for example, as shown in FIG. 3B, even if the width of the reflective common electrode 18b' on the data line 13 is made smaller than the case shown in FIG. 3A (which corresponds to FIG. 2B), the similar advantage can be obtained. Similarly, as shown in FIG. 4B, even if the width of the transmissive common electrode 18a' on the data line 13 is made wider than the case shown in FIG. 4A (which corresponds to FIG. 2C), the similar advantage can be obtained.

In FIG. 1 through FIG. 4, the relation between the electrodes in the display portion 310 and the black matrix 22 is specified, respectively. However, because the transmissive common electrode line 18a and the reflective common electrode line 18b are arranged on the peripheral area around the display portion 310 as shown in FIG. 5A, the width of the transmissive common electrode line 18a (the wiring connected to the non-inversed amplifying circuit 321 through a regulator circuit 322 provided on a flexible printed circuit (FPC) 320) can be made larger than that shown in FIG. 5A. Or, the width of the reflective common electrode line 18b (the wiring connected to the inverse amplification circuit 323 through a regulator circuit 322 provided on the FPC 320) can be made smaller than that shown in FIG. 5A. In FIG. 5, the reference numeral 311 represents a LC driver.

In the above mentioned example, it is shown a method to increase the overlapped areas between the black matrix 22 and either one of the transmissive common electrode line 18a, the transmissive common electrode 18a and the transmissive pixel electrode 17a. However, in order to confirm an appropriate overlapped area of the black matrix 22, a plurality of samples are prepared and considered. That is, one sample is made like the related arts such that the black matrix 22 is made to have the same width at the reflective area 2 and the transmissive area 3, and the other sample is made by using one of the above-mentioned method such that overlapped area between the transmissive common electrode 18a' and the black matrix 22 is relatively changed to the overlapped area between the reflective common electrode 18b' and the black matrix 22.

Figure 7:
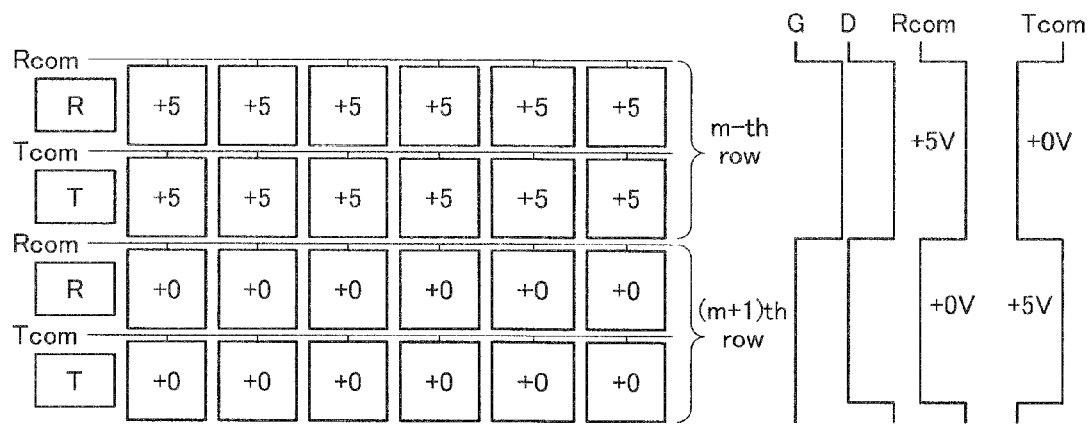
FIG. 7 is a drawing illustrating a gate-line inversion drive technique.
Figure 8:
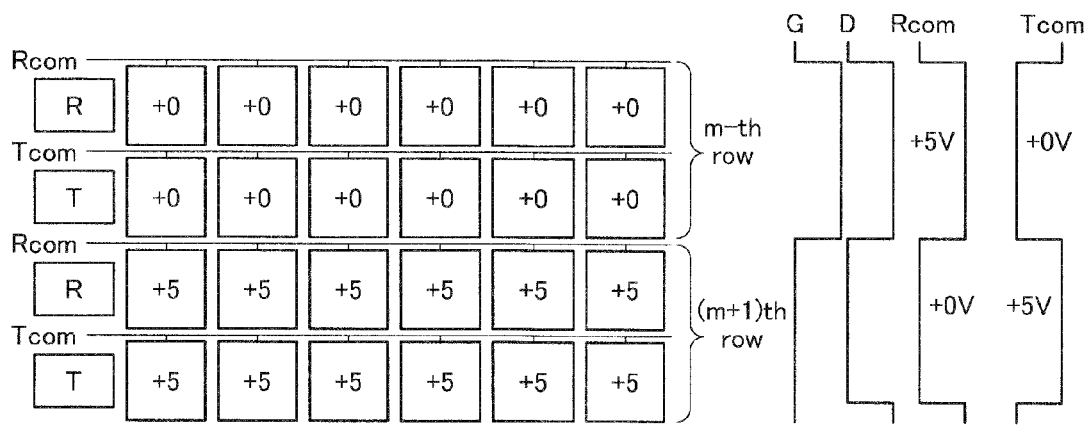
FIG. 8 is a drawing illustrating a gate-line inversion drive technique.

And the gate-line inversion technique is performed in which the phase of the pixel potential and the common potential reverses for each scanning line 12, and the display by each sample is performed respectively. In this case, as shown in FIG. 7 and FIG. 8, the identical signal (D) from the data line 13 is supplied to the transmissive pixel electrode 17a and the reflective pixel electrode 17b through respective TFT. The transmissive common signal (Tcom) which reverses for each line is sent to the transmissive common electrode line 18a, and the reflective common signal (Rcom) in which the phase is reversed with that of the transmissive common signal is supplied to the reflective common electrode line 18b. In FIG. 7 and FIG. 8, the symbol G indicates the signal applied to the scanning line (the gate line). The numerical character inside each box indicates the electric potential of the applied data signal to the pixel electrode.

In FIG. 7 and FIG. 8, although the amplitude of the reflective common signal (Rcom) is made to have the same amplitude of the transmissive common signal (Tcom), it may be made to be the same or different depending on the interval of the common electrode and the pixel electrode or the thickness of the LC layer. Here, as the amplitude of the transmissive common signal (Tcom) is 5.2 V, the amplitude of the reflective common signal (Rcom) is adjusted so as to be the same. The interval between the transmissive pixel electrode 17a and transmissive common electrode 18a' is made to be 8 μm, the interval between the reflective pixel electrode 17b and the reflective common electrode 18b' is made to be 4 μm. The thickness of the LC layer 30 in the transmissive area 3 is made to be 3.2 μm while the thickness of the LC layer 30 in the reflective area 2 is made to be 2.0 μm.

The above-mentioned gate-line inversion drive technique is generally stated by referring FIG. 7, wherein the data signal D is applied to the transmissive pixel electrode 17a and the reflective pixel electrode 17b of each pixel in both of the reflective area and the transmissive area, and the electric potential of the line (m-th row) where the gate signal G and the data signal D are the state of High will be +5 V. On the other hand, because the transmissive common signal (Tcom) is 0 V and the reflective common signal (Rcom) is +5 V, the electric potential difference between the electric potential difference of the transmissive pixel electrode 17a and the transmissive common electrode 18a' will be +5 V, and the electric potential difference between the reflective pixel electrode 17b and the reflective common electrode 18b' will be 0 V. In the line ((m+1)-th row) wherein the gate signal G and the data signal D are the state of Low, although the electric potential of the transmissive pixel electrode 17a and the reflective pixel electrode 17b will be 0 V, because the Tcom is +5 V and the Rcom is the 0 V, the electric potential difference between the reflective pixel electrode 17b and the reflective common electrode 18b' will be +5 V, while the electric potential difference between the transmissive pixel electrode 17a and the transmissive common electrode 18a' will be 0 V. As a result, the electric field is only applied to the transmissive area, and the LC molecules in the transmissive area will rotate.

Figure 11:
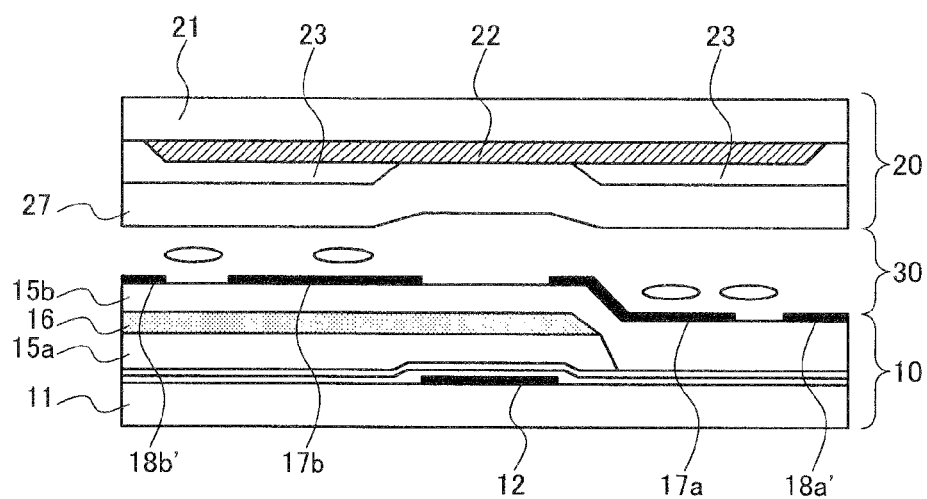
FIG. 11 is a cross sectional view showing a pixel structure of the transflective LCD device with IPS mode for both of the reflective area and the transmissive area.
Figure 12:
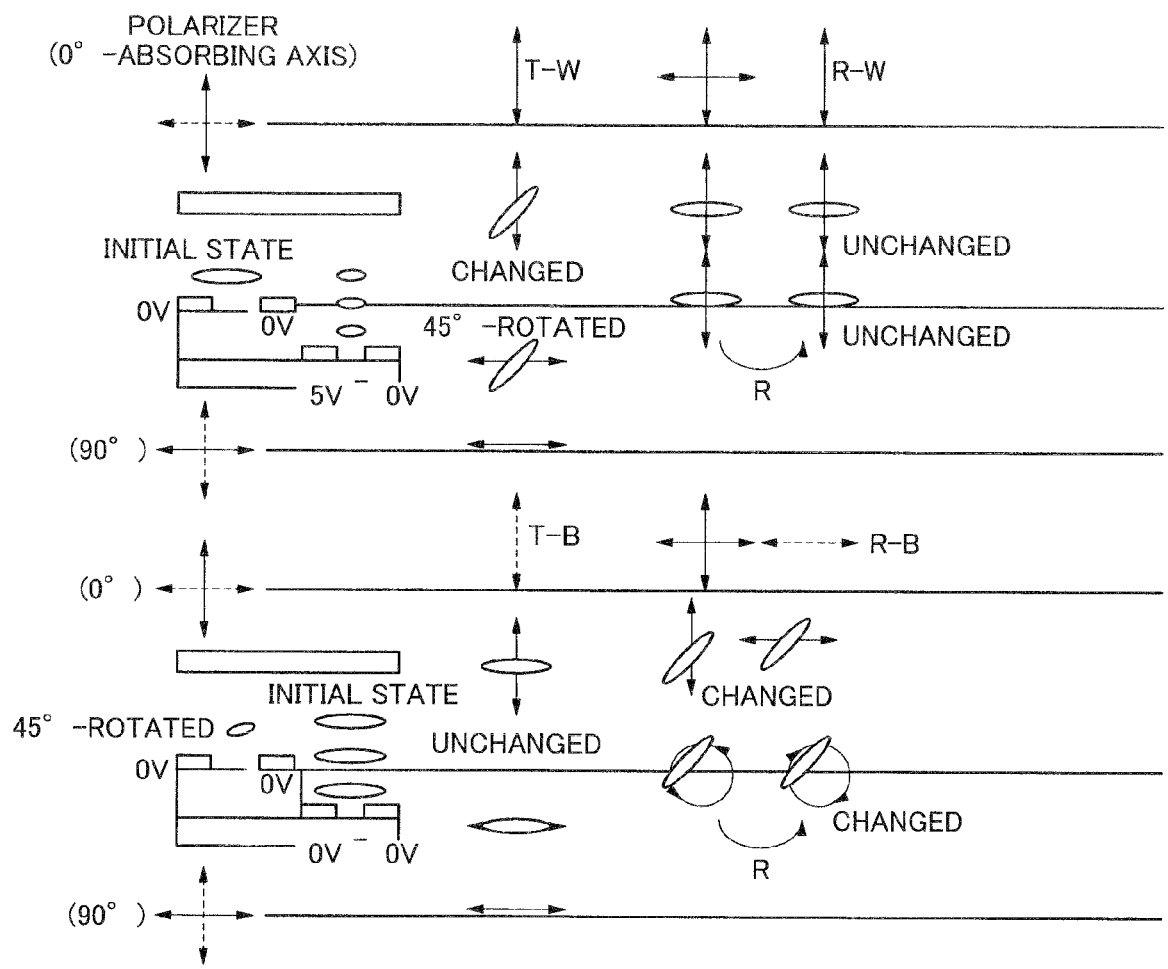
FIG. 12 is a drawing showing an operation of the pixel shown in FIG. 11.

In this state, as shown in FIG. 11 and FIG. 12, in the LCD device to be driven by the IPS mode for both of the reflective area 2 and the transmissive areas 3, a linearly polarized light with a polarization direction (a longitudinal direction) of 90 degrees enters the LC layer after passing through the first polarizer in the reflective area (the upper right side of FIG. 12), when a driving voltage is not applied to the LC layer, and then reflected by the reflector, the linearly polarized light passes through the LC layer and the first polarizer again with the 90-degree linearly polarized light. In the transmissive area (the upper left side of FIG. 12), on the other hand, although a linearly polarized light with a polarization direction (a lateral direction) of 0 degree enters the LC layer after passing through the second polarizer, the directions of major axes of the LC molecules changes when the voltage is applied to the LC layer, and thus the zero-degree linearly-polarized light entered the LC layer is changed to a 90-degree linearly polarized light, and then enter the first polarizer to pass through it. Accordingly, it will be the white display in both the reflective area and the transmissive areas.

In the line (m-th row) where the gate signal G is the state of High while the data signal D is the state of Low, as shown in FIG. 8, although the electric potential of the pixel electrode 17a and the reflective pixel electrode 17b will be 0 V, because the Tcom is 0 V and the Rcom is +5 V, the electric potential difference between the transmissive pixel electrode 17a and transmissive common electrode 18a' will be 0 V while the electric potential difference between the reflective pixel electrode 17b and the reflective common electrode 18b' will be +5 V. On the other hand, in the line ((m+1)-th row) where the gate signal G is the state of Low while the data signal D is the state of High, although the electric potential of the pixel electrode 17a and the reflective pixel electrode 17b will be +5 V, because the Tcom is +5 V and the Rcom is 0 V, the electric potential difference between the transmissive pixel electrode 17a and transmissive common electrode 18a' will be 0 V while the electric potential difference between the reflective pixel electrode 17b and the reflective common electrode 18b4 will be +5 V. As a result, the electric field is only applied to the reflective area, and thus the LC molecules in the reflective area will rotate.

In this state, as shown in FIG. 11 and FIG. 12, although the 90-degree linearly polarized (the longitudinal direction) light enters the LC layer after passing through the first polarizer in the reflective area (the lower right side of FIG. 12), because the major axis direction of the LC molecules in the LC layer changes due to the applied voltage, the linearly polarized light is changed into a counterclockwise-circularly-polarized light and enters the reflector. The light reflected by the reflector passes the LC layer again and enters the first polarizer with the zero-degree linearly-polarized light. Since the first polarizer has a polarizing axis at 90 degrees, the reflected incident light is blocked to pass through. In the transmissive area (the lower left side of FIG. 12), on the other hand, the 0-degree linearly polarized (the lateral direction) light enters the LC layer after passing through the second polarizer and enter the first polarizer after passing through the LC layer. Since the first polarizer has a polarizing axis at 90 degrees, the transmissive light is blocked to pass through. Accordingly, it will be the black display in both the reflective area and the transmissive areas.

Thus, even if the identical video signal is given for the display in the transmissive area 3 and the reflective area 2, the reflective display and transmissive display perform the same display of the black display and the white display.

Here, when the overlapped area of the transmissive common electrode line 18a and the black matrix 22 is designated as St1, the overlapped area of the transmissive common electrode 18a' and the black matrix 22 is designated as St2, the overlapped area of the reflective common electrode line 18b and the black matrix 22 is designated as Sr1, and the overlapped area of the reflective common electrode 18b' and the black matrix 22 is designated as Sr2, respectively, the ratio of occupying each overlapped area by the transmissive common signal (referred to an area transmissive ratio α) can be represented by the following equation.

$$\alpha = (St1+St2)/(St1+St2+Sr1+Sr2) \quad (7)$$

Four samples are made by using one of the above-mentioned techniques such that overlapped area between the black matrix 22 and both of the transmissive common electrode 18a' and the transmissive common electrode line 18a is relatively changed to the overlapped area between the black matrix 22 and both of the reflective common electrode 18b' and the reflective common electrode line 18b to provide samples having the α of 54%, 64%, 72% and 100% to measure its contrast ratio. In here, α=100% indicates the state that the transmissive common signal (Tcom) is applied to the reflective common electrode line 18b.

As a result, as shown in FIG. 6, the contrast ratios in the samples are changed such that the ratio of 140:1 for α=54%; 180:1 for α=64%; 450:1 for α=72%; and 450:1 for α=100%, respectively.

When the waveform is checked for the sample of α=54% by using an oscilloscope, owing to the signal influence of the scanning line, the electric potential (the short broken line in the drawing) of the black matrix 22 is the intermediate electric potential where the electric potential does not change in both of the line A (the transmissive common signal is "Low" state and the reflective common signal is "High" state) and the line B (the transmissive common signal is "High" state and the reflective common signal is "Low" state) next to the line A. Owing to this, the electric potential of the black matrix 22 is caused to have a large electric potential difference from the transmissive common signal, and thus it is assumed that the contrast ratio is decreased in both of the line A and the line B.

In the sample of α=72%, owing to the signal influence from the scanning line and because the phase in the line A and the line B is shifted toward the transmissive area, the electric potential of the black matrix 22 is not caused to have the large electric potential difference from the transmissive common signal. As a result, it is assumed that the LC is not activated between the black matrix and both of the transmissive common electrode and the transmissive pixel electrode, and therefore the light leakage is not generated and thereby improving the contrast ratio. In this experiment, a part of the scanning line is not shielded. Therefore, the period of time for turning off the TFT with a turn-off voltage (−12 V) is longer than that for turning on the TFT with a turn-on voltage (+12 V). As a result, as the whole, it shifts to the minus side. That is, in the case of α=54%, while it shifts to the side of the transmissive common signal in the line A, it shifts to the side of the reflective common signal in the line B, and thereby generating more light leakage in the line B. Accordingly, in this case, it is required to shield the scanning line.

Here, the electric potential of the black matrix can be measured by using the oscilloscope such that the opposed substrate is scraped to expose the black matrix to be connected to the terminal of the oscilloscope either by directly or through conductive material such as solder. The reflective common signal and the transmissive common signal can be measured by using the oscilloscope as in the case of measuring the electric potential of the black matrix by scraping the film which covers the reflective common signal line and the transmissive common signal line of the TFT substrate, or may be measured by using the electrode terminals exposed from the TFT substrate.

When the pixel of the black display is observed, light is observed around the transmissive common electrode $18a'$ in the sample of α=54%, while no light leakage is observed in those samples of α=72% and α=100%.

In view of the foregoing results, by adjusting the overlapped area between the black matrix 22 and either one of the common electrode line and the common electrode such that the area transmissive ratio α is larger than 72% (α>72%), when the black display is performed without the electric potential difference between the transmissive pixel electrode $17a'$ and the transmissive common signal, because the electric potential difference between the black matrix 22 and the transmissive common signal is made small, the rotation of the director is suppressed and the light leakage can be suppressed.

Here, when the capacitance is calculated from the area formed by St1, St2, Sr1 and Sr2, and representing it to be Ct1, Ct2, Cr1 and Cr2 respectively, a capacitance transmissive ratio αC is expressed in the following equation.

$$\alpha C = (Ct1 + Ct2)/(Ct1 + Ct2 + Cr1 + Cr2) \quad (8)$$

The respective level of α=54%, α=64%, α=72% and α=100% will be αC=50%, αC=60%, αC=73% and αC=100%. Because the transmissive common signal and the reflective common signal have the signal of the same amplitude, the level of the electric potential of the black matrix can be known by the value of the αC, i.e., the αC indicates on which side the electric potential of the black matrix is shifted. In the case of αC=50%, the electric potential of the black matrix will be the electric potential of the middle potential between the transmissive common signal and the reflective common signal (lower left side of FIG. 6), and when the capacitance transmissive ratio increases, the electric potential of the black matrix reaches close to the electric potential of transmissive common signal, and the electric potential difference between the transmissive common electrode and the black matrix becomes small and thereby decreasing the light leakage as shown in FIG. 6.

Figure 9:
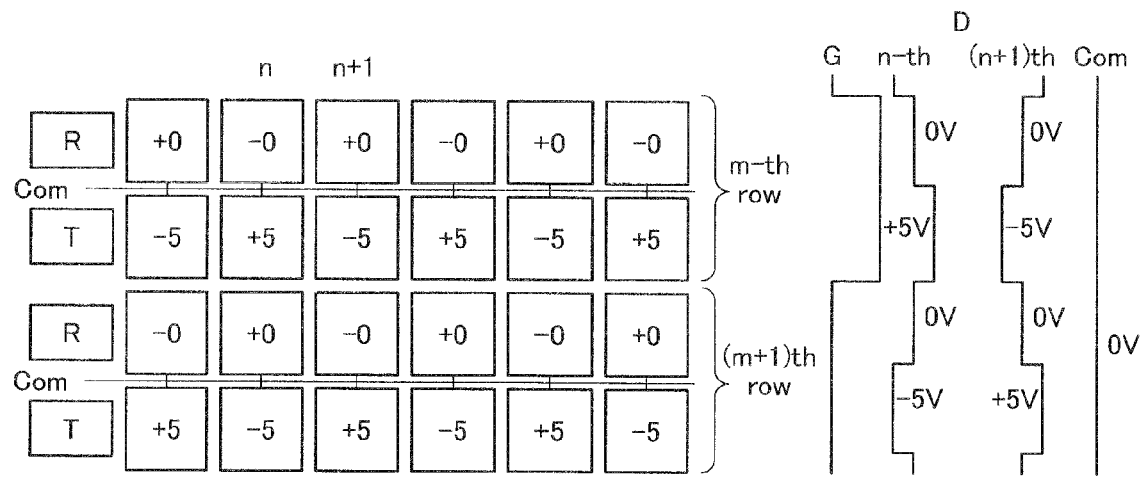
FIG. 9 is a drawing illustrating a dot inversion drive technique.
Figure 10:
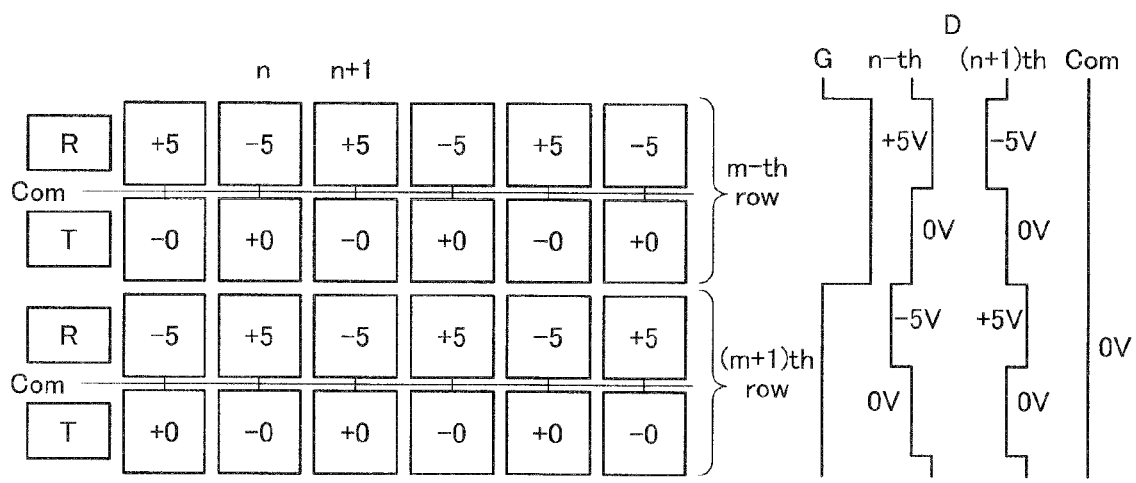
FIG. 10 is a drawing illustrating a dot inversion drive technique.

In the above-mentioned exemplary embodiment, the transflective LCD device is operated by using the gate-line inversion drive technique by which the phase of the pixel potential and the common potential reverses for each scanning line 12. However, the similar advantage can be obtained by using the dot inversion drive technique as shown in FIG. 9 and FIG. 10 in which the different pixel signals are applied to the reflective area and the transmissive area, respectively, while the same common signal is applied to the reflective area and the transmissive area. In the illustrated example, the same data line is used for the transmissive area and the reflective area and the gate line is prepared for respective areas to apply different signals thereto, respectively with one line. As long as the different pixel signals are applied to the transmissive area and the reflective area, respectively, the other techniques may be used.

The present invention is not limited to the LCD device which drives both of the reflective area 2 and the transmissive area 3 by using IPS mode. For example, as shown in FIG. 15, it can also be applied similarly to the LCD device which drives one or both of the reflective area 2 and the transmissive area 3 by using an FFS (Fringe-Field-Switching) mode. Furthermore, the present invention can also be applied to an LCD device which is driven by an ECB (Electrically Controlled Birefringence) mode to control the birefringence of the LC layer 30 with the electric field between the TFT substrate 10 and the opposed substrate 20, by providing a reflective pixel electrode $17b$ on the TFT substrate 10 while the reflective common electrode $18b'$ is formed on the opposed substrate 20 as shown in FIG. 13 and FIG. 14.

Figure 13:
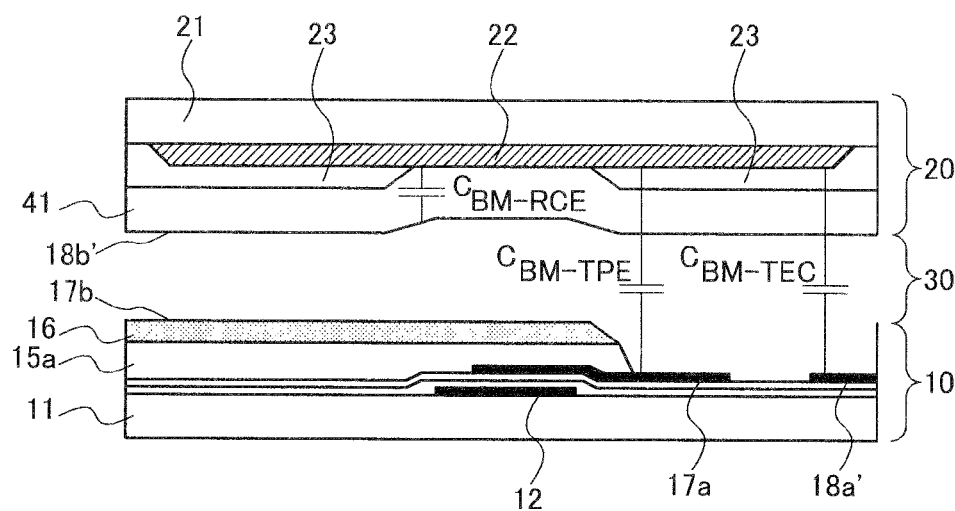
FIG. 13 is a cross sectional view showing the pixel structure of the transflective LCD device with ECB mode for the reflective area and IPS mode for the transmissive area.
Figure 14:
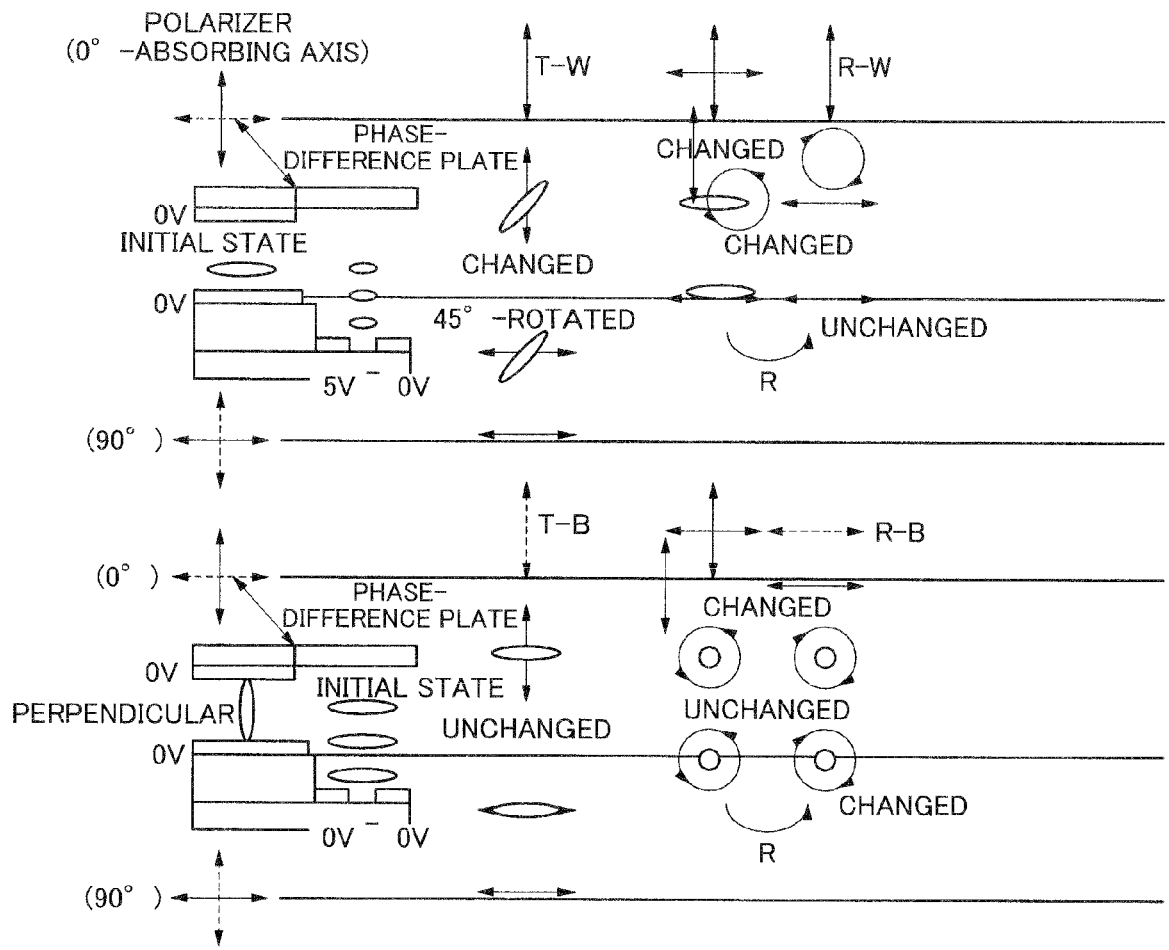
FIG. 14 is a drawing showing an operation of the pixel shown in FIG. 13.
Figure 15:
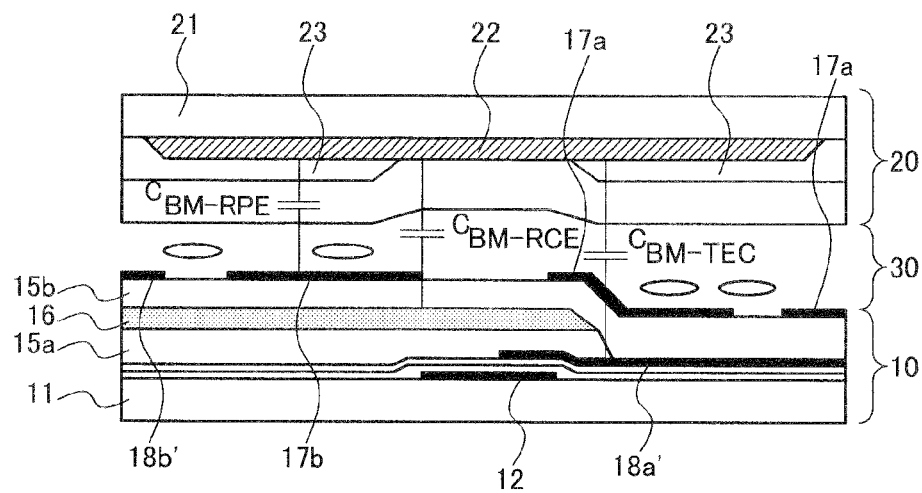
FIG. 15 is a cross sectional view showing a pixel structure of the transflective LCD device with FFS mode for both of the reflective area and the transmissive area.

In FIG. 13 and FIG. 14, although the LC layer 30 in the reflective area 2 is made to have a homogeneous orientation and a phase difference plate is formed in the reflective area 2, the present invention is available to use a VA (Vertical Alignment) mode in which LC molecules are initially aligned vertical to the substrate, and being operated similarly by reverse drive technique to perform all alike display even if the presence of the normally black display and the normally white display.

Although the adopted structure here is the normally black display in the transmissive area and the normally white display in the reflective area, it is possible to perform the normally white display in the transmissive area and the normally black display in the reflective area, when IPS method is used for both of the transmissive area and the reflective area by revolving the angle of the polarizer by 45 degrees.

Exemplary Embodiment 2

Figure 16:
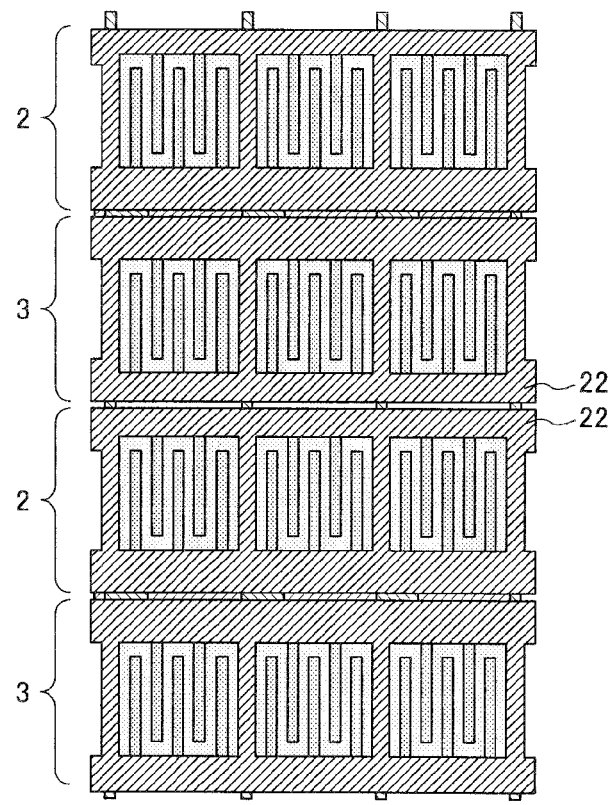
FIG. 16 is a plan view showing a pixel structure of the transflective LCD device according to a second exemplary embodiment of the present invention.
Figure 17:
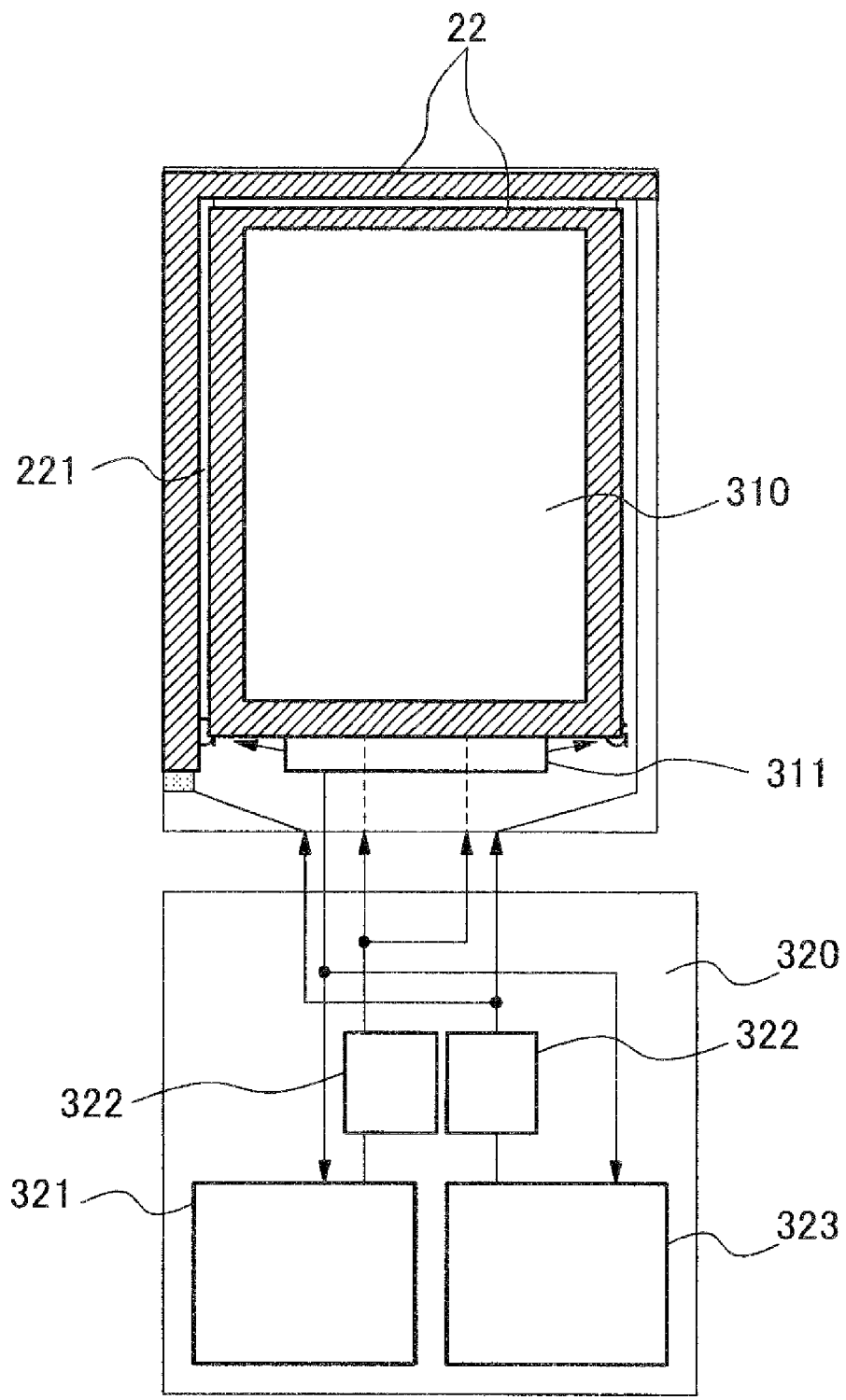
FIG. 17 is a schematic circuit diagram showing the state of wiring in the peripheral area around a display portion of the transflective LCD device according to the second exemplary embodiment of the present invention.
Figure 18:
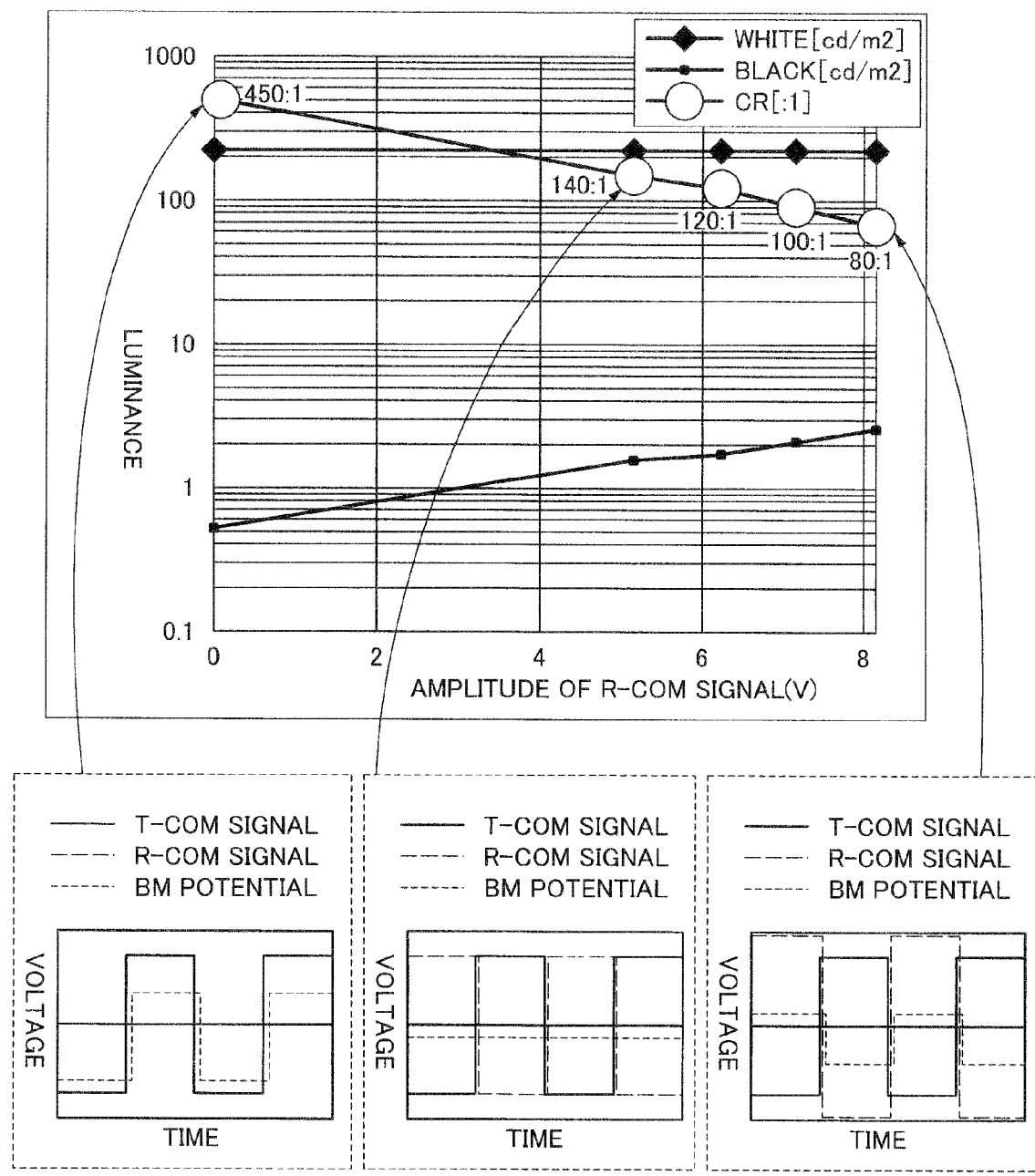
FIG. 18 is a graph showing a relation between amplitude of a reflective common signal and the contrast.

Next, an LCD device according to a second exemplary embodiment of the present invention will be described with reference to FIG. 16 through FIG. 18. In FIG. 16 and FIG. 17, plan views of the transflective LCD device of this exemplary embodiment are shown. FIG. 18 is a graph where the contrast is measured while changing the amplitude of the reflective common signal.

In the first exemplary embodiment mentioned above, the influence of the transmissive common signal is made large by increasing the overlapped area between the transmissive common electrode $18a'$ and the black matrix 22. However, the similar advantage can be also expected by reducing the influence of the reflective common signal. In this exemplary embodiment, like in the first exemplary embodiment, the thickness of the LC layer and the interval of electrodes are designed such that the first interval between the transmissive common electrode and the transmissive pixel electrode is 8 μm while the second interval between the reflective common electrode and the reflective pixel electrode is made so as to be a half size of the first interval, i.e., 4 μm. In such configuration, when the number of electrodes is increased, because the LC molecules on the electrode does not revolve to the substrate plane direction compared to those LC molecules located between the electrodes, such problem as constant gleaming occurs. Accordingly, the area of the electrode can be reduced by expanding the interval between the reflective common electrode and the reflective pixel electrode into 6 μm from 4 μm. However, the voltage applied between those electrodes needs to be increased by increasing the interval thereof, and the reflective common signal is needed to increase to 8 V.

First, in order to confirm the influence of the reflective common signal, measurement is made for the change in the contrast when changing the voltage applied to the reflective common electrode 18b'. The result is shown in FIG. 18. As shown in FIG. 18, as the amplitude (V) of the reflective common signal becomes large, the brightness of the white display is decreased while the brightness of the black display is increased, and then the contrast is decreased. When the voltage of each state is confirmed by the oscilloscope, when the amplitude of the reflective common signal is 0 V, the electric potential of the black matrix 22 follows the transmissive common signal. However, when both of the amplitude of the reflective common signal and the transmissive common signal is 5.2 V with reversed phase each other, the electric potential of the black matrix 22 is almost fixed, and when the amplitude of the reflective common signal is 8 V, the electric potential of the black matrix 22 follows the reflective common signal. Accordingly, when the amplitude of the reflective common signal becomes large, the electric potential of the black matrix 22 is pulled to the reflective common signal. As a result, it is assumed that the electric potential differences between the black matrix 22 and both of the reflective common signal and the transmissive common signal of the anti-phase become large, and the light leakage occurs and results in decreasing contrast.

Accordingly, in this exemplary embodiment, in order to suppress the electric potential difference between the transmissive common signal and the black matrix 22, for example, as shown in FIG. 16, the black matrix 22 of the reflective area 2 and the black matrix 22 of the transmissive area 3 are separated electrically in the display portion. As shown in FIG. 17, in the peripheral area of the display portion, the black matrix 22 above the transmissive common electrode line 18a and the black matrix 22 above the reflective common electrode 18b are formed by providing a slit 221 into the black matrix film pattern to electrically separate them. As shown in FIG. 17, on the other hand, the configuration of the black matrix structure that separates the black matrix located above the reflective common electrode line 18b can be electrically separated from the black matrix 22 located outside the display portion, i.e., its peripheral area, by forming the slit into the black matrix film pattern. Further, the black matrix 22 can be separated electrically by forming a slit into the black matrix film pattern at the display portion and its peripheral area.

Thus, by separating the black matrix 22, in spite of the amplitude of the reflective common signal, the electric potential of the black matrix 22 can be made follow to the transmissive common signal. As a result, the light leakage caused by the electric potential difference between the black matrix 22 and either one of the transmissive common electrode 18a' and the transmissive common electrode line 18a can be suppressed. Furthermore, the contrast of 450:1 could be realized by forming the slit between the black matrix formed on the reflective area and the black matrix formed on the transmissive area to electrically separate them.

Further, in the structure of FIG. 16, because the scanning line 12 is formed in the area corresponding to the slit portion separating the black matrix 22 into two portions, there is no worry to which the transmitted light leakages out. This slit portion may be covered with the reflector to provide the similar advantageous effect. When forming the scanning line 12 with light shading member, the light leakage by the reflected light does not occur. Here, it explained that it is possible to exclude the influence of CBM-RCE from the electric potential of the black matrix which influences the transmissive area by adopting the black matrix structure which is separated in the display portion. However, the influence of CBM-RCL can be excluded by electrically separating the black matrix in the peripheral portion from the black matrix connected to the transmissive area, and the transmissive common signal becomes relatively influential.

Exemplary Embodiment 3

Figure 19:
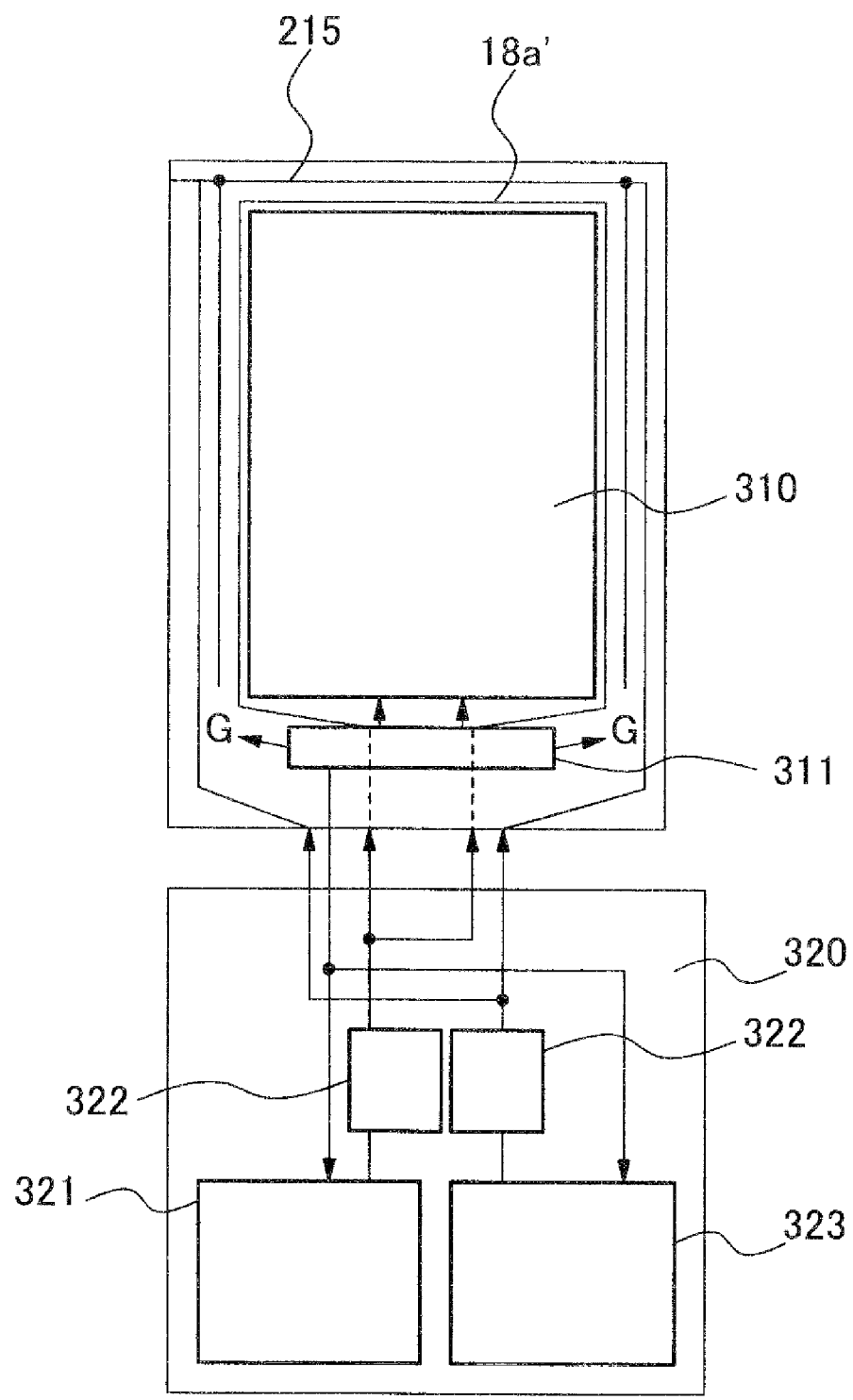
FIG. 19 is a schematic circuit diagram showing the state of wiring in the peripheral area around a display portion of the transflective LCD device according to a third exemplary embodiment of the present invention.

Next, an LCD device according to a third exemplary embodiment of the present invention will be described with reference to FIG. 19. In FIG. 19, a plan view of the structure of the transflective LCD device of this exemplary embodiment is shown.

In the second exemplary embodiment mentioned above, by separating the black matrix 22, the black matrix 22 does not undergo the influence of the reflective common signal. However, by covering the reflective common electrode 18b' or the reflective common electrode line 18b with the conductive film and by applying the different electric potential thereto to form the shield configuration, the influence of the reflective common signal can be suppressed.

For example, as shown in FIG. 19, the reflective common electrode line 18b (the wiring connected to the inverse amplification circuit 323 through a regulator circuit 322 provided on the FPC 320) in the peripheral area of the TFT substrate 10 of the LCD device is made of the same metal as the gate line. And a shield layer 215 is formed on that with the same material of ITO forming the pixel electrode and the common electrode, and connecting it with the transmissive common electrode line through a contact hole, and thereby applying the transmissive common signal to the shield layer 215. Thus, the overlapped area between the reflective common electrode line and the black matrix can be changed to have the electric potential of the same phase of the transmissive common electrode line. As a result, the amount contributed portion of the transmissive common signal can be added to the electric potential of the black matrix.

In the foregoing, the reflective common electrode line is made of the same metal as the gate line, while the shield layer is made of the same metal as the pixel electrode and the common electrode. However, it is also possible to provide a conductive layer between the reflective common electrode line and the black matrix and applying the electric potential of the transmissive common signal thereto. Therefore, it may be made of other conductive layer and the member for the shielding may be added newly. The shield structure is not limited to the TFT substrate but also can be applied to the opposite substrate side, and in that case, the transmissive common signal should be applied thereto in the same manner.

Exemplary Embodiment 4

Figures 20A, 20B:
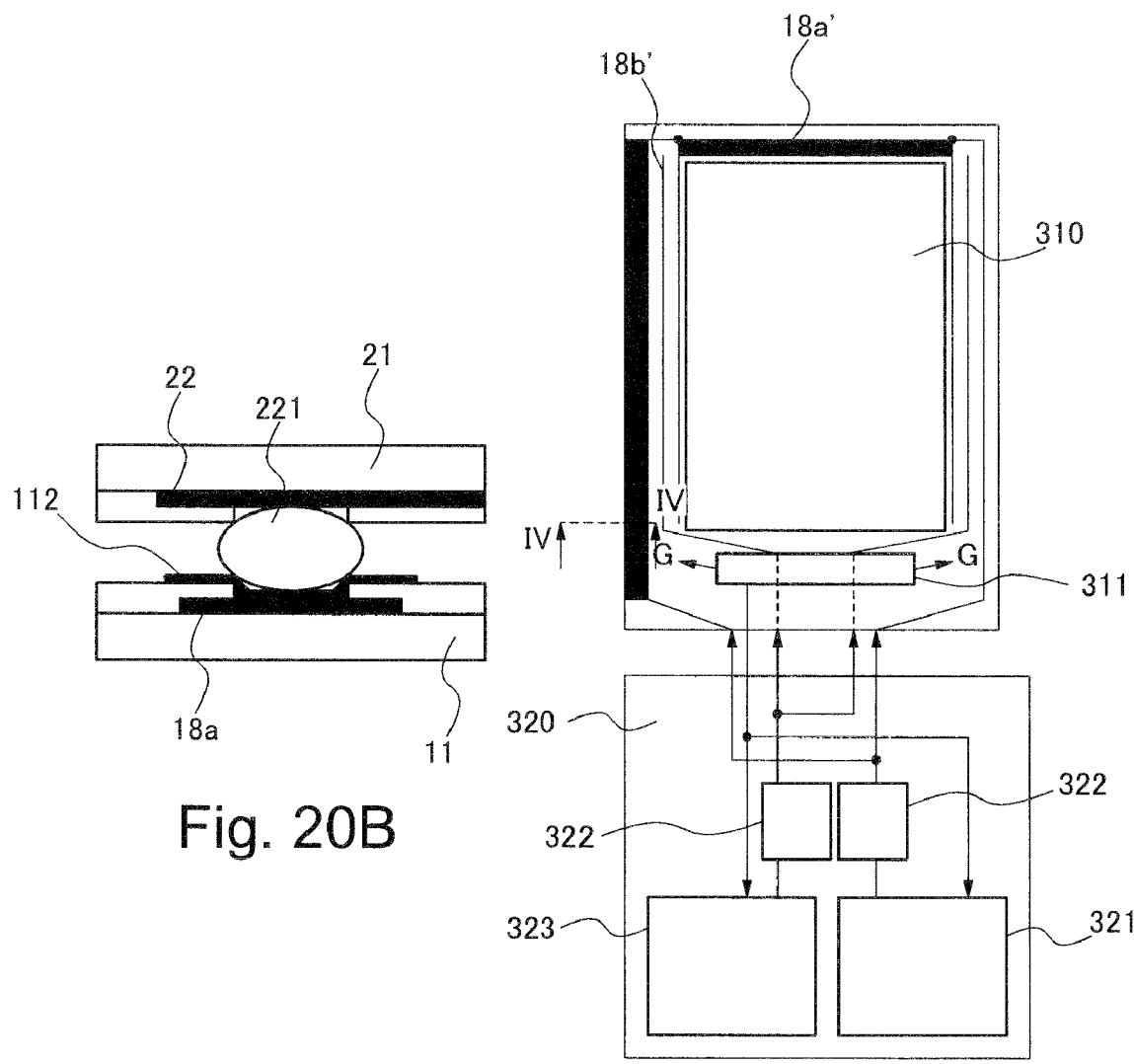
FIG. 20A is a schematic circuit diagram showing the state of wiring in the peripheral area around a display portion of the transflective LCD device according to a fourth exemplary embodiment of the present invention.
FIG. 20B is a cross sectional view along the IV-IV line shown in FIG. 20A.
Figures 21A, 21B:
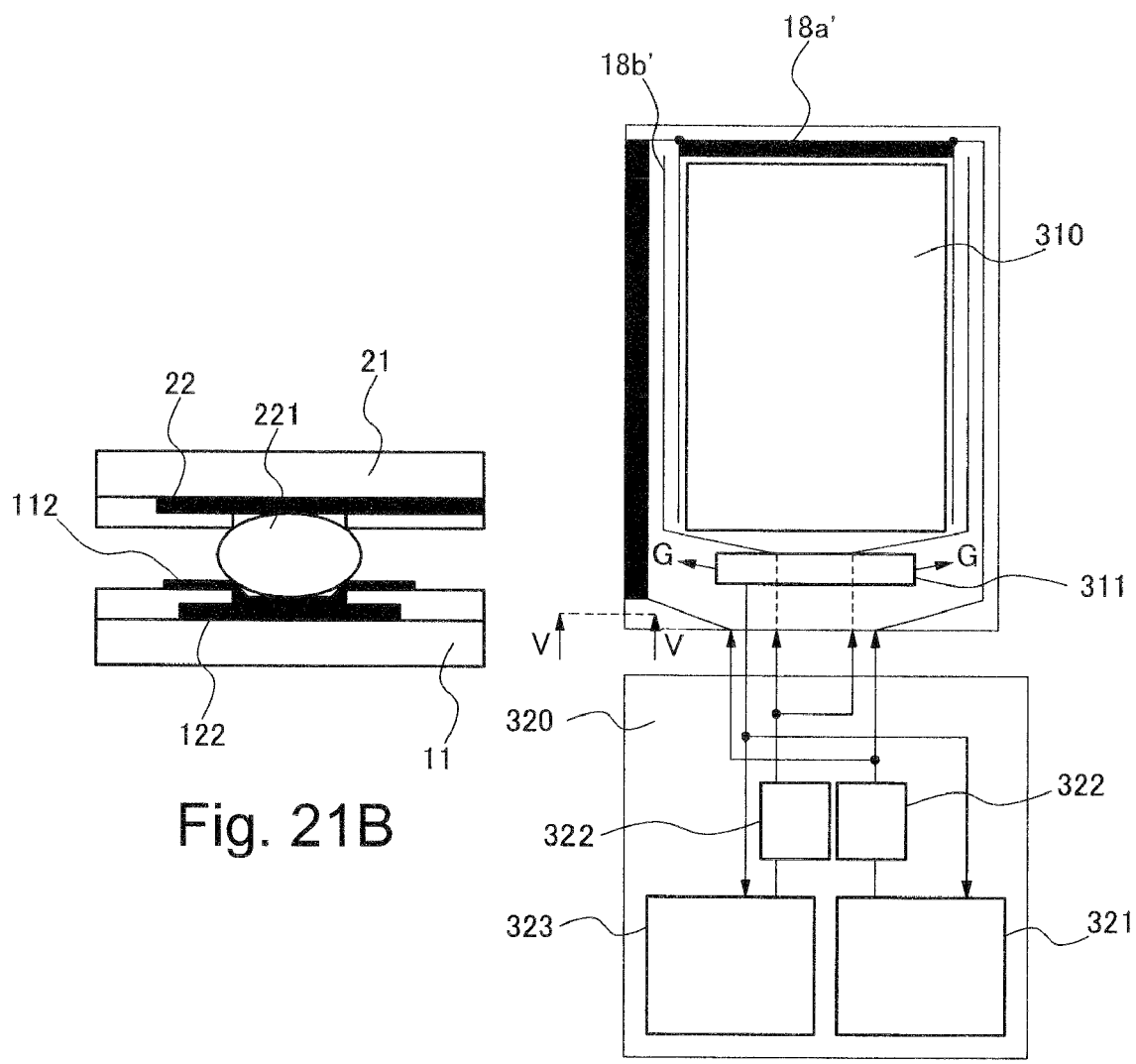
FIG. 21A is another schematic circuit diagram showing the state of wiring in the peripheral area around a display portion of the transflective LCD device according to the fourth exemplary embodiment of the present invention.
FIG. 21B is a cross sectional view along the V-V line shown in FIG. 21A lines.

Next, the LCD device according to the fourth exemplary embodiment of the present invention will be described with reference to FIG. 20 and FIG. 21. FIG. 20A is a plan view showing the structure of the transflective LCD device of this exemplary embodiment and FIG. 20B is a cross sectional view along the IV-IV line of FIG. 20A. FIG. 21A is a plan view showing another structure of the transflective LCD device of this exemplary embodiment and FIG. 21B is a cross sectional view along the V-V line of FIG. 21A.

In the first to third exemplary embodiments mentioned above, the techniques of either making the influence of the transmissive common signal easy to undergo or making the influence of the reflective common signal difficult to undergo is disclosed. However, it is possible to eliminate the electric potential difference between the transmissive common electrode and the black matrix by applying the transmissive common signal to the black matrix 22.

In this exemplary embodiment, as shown in FIG. 20A and FIG. 20B, in the peripheral area (the broker line part of FIG. 20A, for example), the electric potential can be given by forming the contact electrode 112 on the transmissive common electrode line 18*a* of the TFT substrate 10, and connecting the contact electrode 112 and the black matrix 22 using the conductive paste or the particles 221 treated with conductive processing on the surface thereof. There is also a technique to prepare the black matrix electrode wire 122 for the black matrix separately as the circuit which gives the signal of the same phase with the transmissive common signal apart from the transmissive common electrode line 18*a* as shown in FIG. 21A and FIG. 21B, and connect them by the same technique as shown in FIG. 20. Because the signal different from the transmissive common signal can be applied by using such technique, the different signal can be applied by displaying, for example.

The black matrix 22 can be made by dispersing carbon black into the resin. However, because it needs to get the contacted area widely in order to give the electric potential sufficiently, the method to form the conductive film at least on the area where the black matrix contacts can also be used. When using the metal of Cr or a laminated member with the metal oxide for the black matrix, the contact hole can be made small.

Further, the connecting structure and the connecting location between the black matrix 22 and either one of the transmissive common electrode line 18*a* and the black matrix electrode wire 122 are riot limited to the illustrated configuration.

Exemplary Embodiment 5

Next, an LCD device according to a fifth exemplary embodiment of the present invention will be described with reference to FIG. 22 through FIG. 25 showing a cross-sectional structure of the transflective LCD device of this exemplary embodiment.

In the first to fourth exemplary embodiments mentioned above, although the shape and the structure of the common electrode and the black matrix 22 are disclosed, the similar advantages can also be obtained by changing the interval of the common electrode and the black matrix 22 and the dielectric constant.

Figure 22:
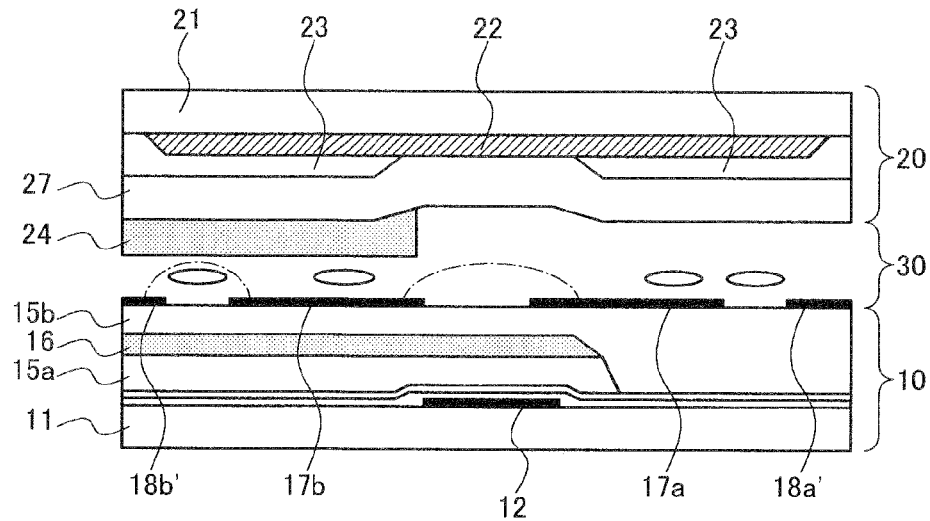
FIG. 22 is a cross sectional view showing a pixel structure of the transflective LCD device according to a fifth exemplary embodiment of the present invention.

For example, as shown in FIG. 22, without making the step film for adjusting the thickness of the LC layer between the passivation film and the reflective film on the data line, the step film 24 can be provided on the opposite substrate side. The passivation film can be combined with the uneven film. By making it such configuration, even if the thickness of the LC layer of the reflective area is made thinner than that of the transmissive area, the distance between the black matrix and both of the reflective common electrode and the reflective pixel electrode can be increased and the capacitance CBM-RCE and CBM-RPE formed therebetween can be made small. When adopting lower dielectric constant for the step film 24 than the liquid crystal, CBM-RCE and CBM-RPE are able to be further made small. By making it such structure, even if the area of the reflective area is the same as the first exemplary embodiment, the electric potential of the black matrix can be controlled without reducing the black matrix 22 unnecessarily, and the display contrast is increased.

Figure 23:
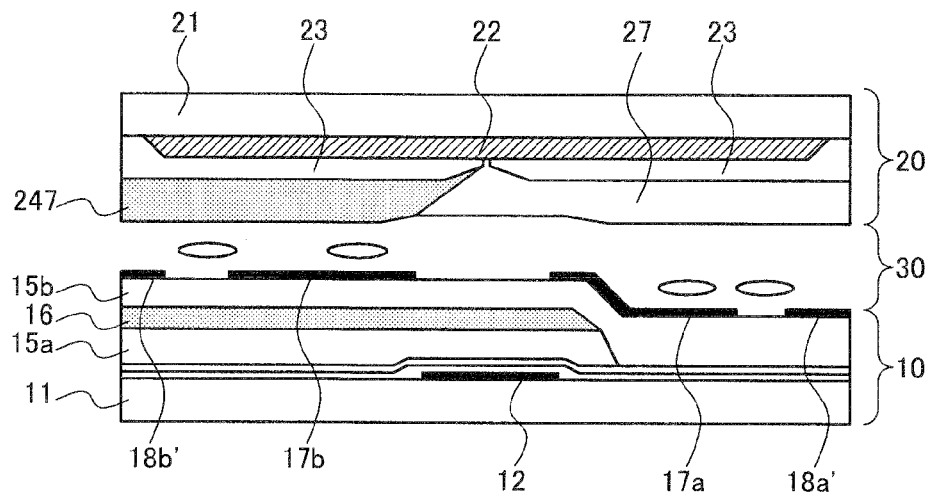
FIG. 23 is a cross sectional view showing the pixel structure or the transflective LCD device according to a partially changed example of the fifth exemplary embodiment of the present invention.
Figure 24:
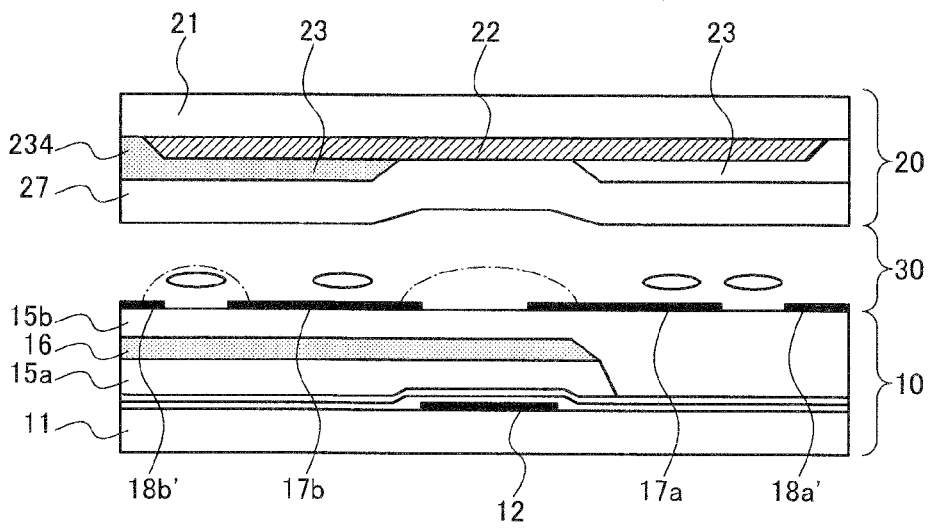
FIG. 24 is a cross sectional view showing the pixel structure of the transflective LCD device according to a partially changed example of the fifth exemplary embodiment of the present invention.

As shown in FIG. 23, different material in the transmissive area and the reflective area can be adopted for the overcoat layer laminated on the black matrix 22 and the color filter 23. More specifically, when the overcoat layer 274 of the reflective area is made of such material having dielectric constant lower than that of the overcoat layer 27 of the transmissive area, CBM-RCE and CBM-RPE can be made small. Moreover, as shown in FIG. 24, different material in the reflective area and the reflective area can be adopted for the color filter. More specifically, when a color filter 234 of the reflective area is made of such material having dielectric constant lower than that of the color filter 23 of the transmissive area, CBM-RCE and CBM-RPE can also be made small.

Figure 25:
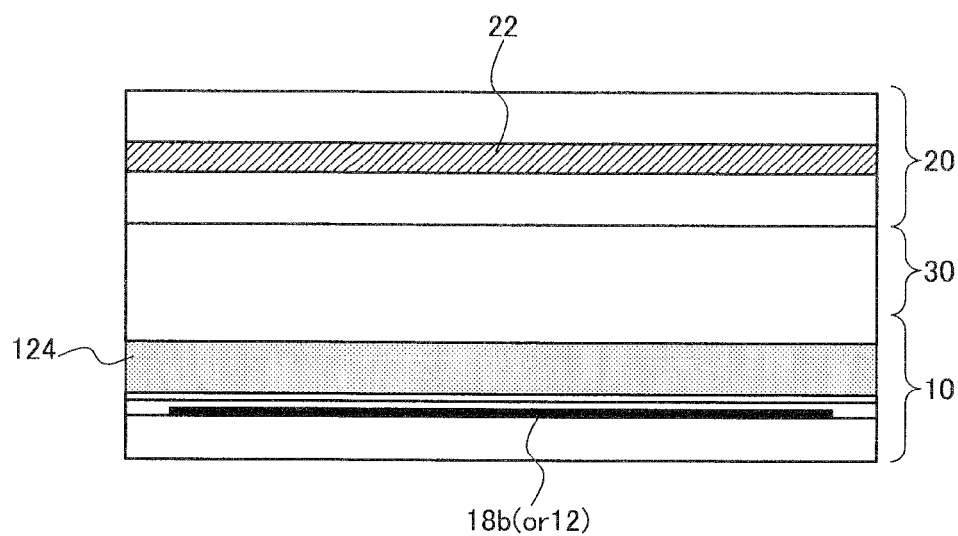
FIG. 25 is a cross sectional view showing the pixel structure of the transflective LCD device according to a partially changed example of the fifth exemplary embodiment of the present invention.

These low dielectric constant layers can be provided between the black matrix and both of the reflective common electrode line and the scanning line, the capacitance CBM-RCL and CBM-Ga formed between the black matrix and both of the reflective common electrode line and the scanning line can also be made small. For example, as shown in FIG. 25, it can be realized by putting a structure 124 having dielectric constant lower than that of the liquid crystal on the reflective common electrode line and the scanning line of the TFT substrate. This structure 124 may be formed by an insulating film 15*b* or a step film, otherwise, it may be created newly. Although an example created on the TFT substrate side is indicated, it is possible to form it on the opposed substrate to obtain the similar advantage.

Further, the structure of each above-mentioned exemplary embodiment may he applied separately and these may be combined optionally. The present invention is not limited to the description of the above-mentioned embodiment, and the electric potential difference formed between the black matrix and the common electrode in the area of the normally black display should be smaller than a larger one of the electric potential difference formed between the black matrix and both of the common electrode and the pixel electrode in the normally white display area.

THE AVAILABILITY ON THE INDUSTRY

The present invention is available in the LCD device having the areas of the normally black display and the areas of the normally white display.

According to the LCD device of the present invention, the light leakage caused by the electric potential formed between the electrode on the active matrix board and the black matrix on the opposed substrate can be suppressed.

This is because, in the LCD device where the LC layer is sandwiched between the active matrix substrate on which the switching elements are arranged in the matrix shape and the opposed substrate on which the black matrix is arranged, and including the first area of the normally black display and the second area of the normally white display, the electric potential difference formed between the black matrix and both of the first common electrode and the first pixel electrode in the first area is made to be smaller than larger one of the electric potential difference formed between the black matrix and both of the second common electrode and the second pixel electrode in the second area. As a result, it is possible to control the electric potential of the black matrix, and suppress the displacement of the director which is produced by the electric potential applied between the black matrix and the electrode in the first area without complicating the structure and the process. Therefore, the light leakage caused by those can be suppressed.

In the present invention, the electric potential difference formed between the black matrix and both of the first common electrode and the first pixel electrode is made to be no more than the threshold voltage (Vth) of activating the liquid crystal. Here, the threshold voltage Vth should satisfy following condition:

$$Vth=(LBLK-L0)/(LWHT-L0)<0.01.$$

wherein, "LBLK" represents the brightness at the black display when "L0" represents the brightness at non-operated state while "LWHT" represents the brightness at the white display.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A liquid crystal display device, comprising:
    a first substrate provided with switching elements arranged in a matrix shape;
    a second substrate provided with at least a black matrix; and
    a liquid crystal display panel provided with a liquid crystal layer sandwiched between said first substrate and said second substrate so as to form a first area for the normally black display and a second area for the normally white display;
    wherein, a first electric potential difference formed between said black matrix and both of a first common electrode and a first pixel electrode formed in said first area on said first substrate is made to be smaller than a larger one of a second electric potential difference formed between said black matrix and both of a second common electrode and second pixel electrode formed in said second area.

2. The liquid crystal display device according to claim 1, wherein said second pixel electrode is formed on said first substrate, and said second common electrode is formed on either one of said first substrate and said second substrate.

3. The liquid crystal display device according to claim 1, wherein said first electric potential difference is no more than a threshold value of activating said liquid crystal layer.

4. A liquid crystal display device, comprising:
    a first substrate provided with switching elements arranged in a matrix shape;
    a second substrate provided with at least a black matrix;
    a liquid crystal display panel provided with a liquid crystal layer sandwiched between said first substrate and said the second substrate so as to form a first area for the normally black display and a second area for the normally white display;
    a first pixel electrode and a first common electrode formed on said first substrate within said first area;
    a first common signal line applying a first common signal to said first common electrode;
    a second pixel electrode formed on said first substrate within said second area; and
    a second common electrode formed on either one of said first substrate or said second substrate within said second area;
    wherein said liquid crystal display device is designed so that a calculated value satisfy a condition such that a difference between said calculated value and an electric potential of said first common signal is smaller than a difference between said calculated value and an electric potential of said second common signal, wherein said calculated value is obtained such that a sum of a first product of said first electric potential of said first common signal and a first capacitance formed between said first common electrode and said black matrix, a second product of said electric potential of said first common signal and a second capacitance formed between said first common electrode line and said black matrix electrically connected to said first area, and a third product of said electric potential of said second common signal and a third capacitance formed between both of said second common electrode and said second common electrode line and said black matrix electrically connected to said first area, is divided by a total sum of said first capacitance, said second capacitance and said third capacitance.

5. The liquid crystal display device according to claim 4, wherein an overlapped area between said first common electrode and said black matrix is larger than an overlapped area between said second common electrode and said black matrix in view of a normal direction of said substrates.

6. The liquid crystal display device according to claim 1, wherein said black matrix is electrically separated from said first area and at least from a part opposing to said second common electrode line in a part of said second area and/or said peripheral area.

7. The liquid crystal display device according to claim 1, wherein said black matrix is electrically separated from a part opposing to said first common electrode line and a part opposing to said second common electrode line in a peripheral area around a display portion.

8. The liquid crystal display device according to claim 1, wherein said second common electrode line is shielded in a peripheral area around a display portion.

9. The liquid crystal display device according to claim 1, wherein said black matrix is electrically connected to either one of said first common electrode line and a line applied with same phase electric potential of said first common signal in a peripheral area around a display portion.

10. The liquid crystal display device according to claim 1, further comprising a low dielectric constant layer provided between said black matrix on said second substrate and said liquid crystal layer, said low dielectric constant layer having a dielectric constant smaller than that of liquid crystal layer and having a thickness at said second area so as to be at least larger than that at said first area including a case of being not formed thereat.

11. The liquid crystal display device according to claim 1, further comprising a layer provided between said black matrix on said second substrate and said liquid crystal layer, said layer having a dielectric constant such that said dielectric constant at said second area is smaller than that at said first area.

12. The liquid crystal display device according to claim 1, wherein said low dielectric constant layer is further provided on at least a part of a peripheral area around a display portion.

13. The liquid crystal display device according to claim 1, further comprising an insulative layer extending to at least a part of a peripheral area around a display portion on said first substrate, said insulative layer being identical to an insulating layer insulating between a reflector and both of said second common electrode and said second pixel electrode.

14. A liquid crystal display device, comprising:
    a first substrate provided with switching elements arranged in a matrix shape;
    a second substrate provided with at least a black matrix;
    a liquid crystal display panel provided with a liquid crystal layer sandwiched between said first substrate and said the second substrate so as to form a first area for the normally black display and a second area for the normally white display;

a first pixel electrode and a first common electrode formed on said first substrate within said first area;

a first common signal line applying a first common signal to said first common electrode;

a second pixel electrode formed on said first substrate within said second area; and a second common electrode formed on either one of said first substrate or said second substrate within said second area, said second common electrode being applied with a same signal as said first common signal;

wherein said liquid crystal display device is designed so that a calculated value satisfy a condition such that a difference between said calculated value and an electric potential of said first pixel electrode is smaller than a difference between said calculated value and an electric potential of said second pixel electrode, wherein said calculated value is obtained such that a sum of a first product of said first electric potential of said first pixel electrode and a first capacitance formed between said first pixel electrode and said black matrix, and a second product of said electric potential of said second pixel electrode and a second capacitance formed between said second pixel electrode and said black matrix electrically connected to said first area, is divided by a total sum of said first capacitance and said second capacitance.

* * * * *